US005778186A

United States Patent [19]

Funaya

[11] Patent Number: 5,778,186
[45] Date of Patent: Jul. 7, 1998

[54] DATA SERVING APPARATUS WITH ACCESS REQUESTS QUANTIZED INTO VARIABLE SIZE DATA AND TIME QUANTIZATION UNITS

[75] Inventor: Koichi Funaya, Tokyo, Japan

[73] Assignee: NEC Corporation, Tokyo, Japan

[21] Appl. No.: 594,446

[22] Filed: Jan. 31, 1996

[30] Foreign Application Priority Data

Jan. 31, 1995 [JP] Japan ................................. 7-034560

[51] Int. Cl.$^6$ .......................... H04N 7/173; G06F 13/14
[52] U.S. Cl. ........................ 395/200.61; 395/200.47; 348/7
[58] Field of Search ................ 395/826, 200.61, 395/200.62, 200.64, 200.47, 200.48, 200.49; 348/7

[56] References Cited

U.S. PATENT DOCUMENTS

| | | | |
|---|---|---|---|
| 4,888,691 | 12/1989 | George et al. | 395/182.13 |
| 5,008,808 | 4/1991 | Fries et al. | 395/826 |
| 5,339,315 | 8/1994 | Maeda et al. | 348/7 |
| 5,446,855 | 8/1995 | Dang et al. | 395/401 |
| 5,453,779 | 9/1995 | Dan et al. | 348/7 |
| 5,508,732 | 4/1996 | Bottomley et al. | 348/7 |
| 5,561,456 | 10/1996 | Yu | 348/7 |
| 5,561,637 | 10/1996 | Dan et al. | 348/7 |
| 5,586,264 | 12/1996 | Belknap et al. | 395/200.49 |
| 5,613,155 | 3/1997 | Baldiga et al. | 395/825 |
| 5,631,694 | 5/1997 | Aggarawl et al. | 348/7 |
| 5,642,152 | 6/1997 | Douceur et al. | 348/7 |
| 5,644,786 | 7/1997 | Gallagher et al. | 395/850 |
| 5,712,976 | 1/1998 | Falcon, Jr. et al. | 348/7 |

FOREIGN PATENT DOCUMENTS

| | | |
|---|---|---|
| 5-41858 | 2/1993 | Japan . |
| 6-214867 | 8/1994 | Japan . |

OTHER PUBLICATIONS

Hardt-Kornacki et al., "Optimization Model for the Delivery of Interactive Multimedia Documents", Globecom '91, pp. 0669–0673, 1991.

Rangan et al, "Designing an On-Demand Multimedia Service", IEEE Communication Magazine, pp. 56–64, Jul. 1992.

*Primary Examiner*—Dinh C. Dung
*Attorney, Agent, or Firm*—Foley & Lardner

[57] ABSTRACT

In a data delivery server apparatus to which a plurality of terminal equipments each having a unique identifier are connected, a storage section stores a plurality of data, each of which includes one or more data blocks. A quantizing section receives an access request as pre-quantization access request from each of the plurality of terminal equipment. The pre-quantization access request requests a data stored in the storage section. The quantizing section also quantizes the access request to produce one or more post-quantization access requests associated with one or more data block of the data. A reducing section produces a collective access request from the post-quantization access requests belonging to each of quantization regions of the quantizing section. An access section accesses the storage section in accordance with each of the collective access requests to read out the corresponding data block from the storage section. A delivery section for delivering the data block to the terminal equipments which have issued the pre-quantization access requests corresponding to each of the collective access request.

23 Claims, 37 Drawing Sheets

DATA BLOCK ARRANGEMENT IN STORAGE APPARATUS

DATA BLOCK ARRANGEMENT IN STORAGE APPARATUS

Fig. 13

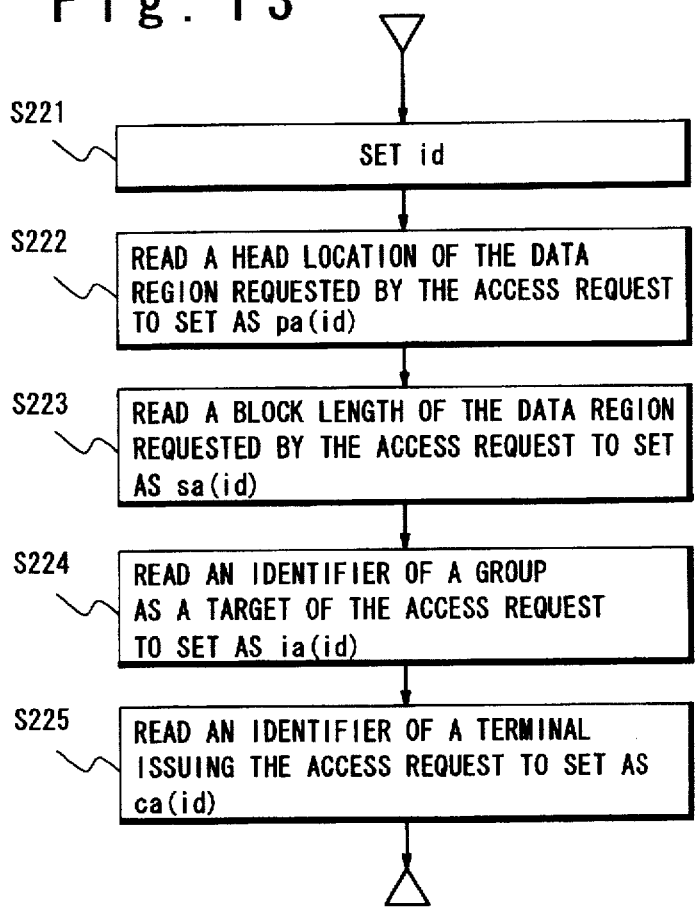

S221 — SET id

S222 — READ A HEAD LOCATION OF THE DATA REGION REQUESTED BY THE ACCESS REQUEST TO SET AS pa(id)

S223 — READ A BLOCK LENGTH OF THE DATA REGION REQUESTED BY THE ACCESS REQUEST TO SET AS sa(id)

S224 — READ AN IDENTIFIER OF A GROUP AS A TARGET OF THE ACCESS REQUEST TO SET AS ia(id)

S225 — READ AN IDENTIFIER OF A TERMINAL ISSUING THE ACCESS REQUEST TO SET AS ca(id)

Fig. 14

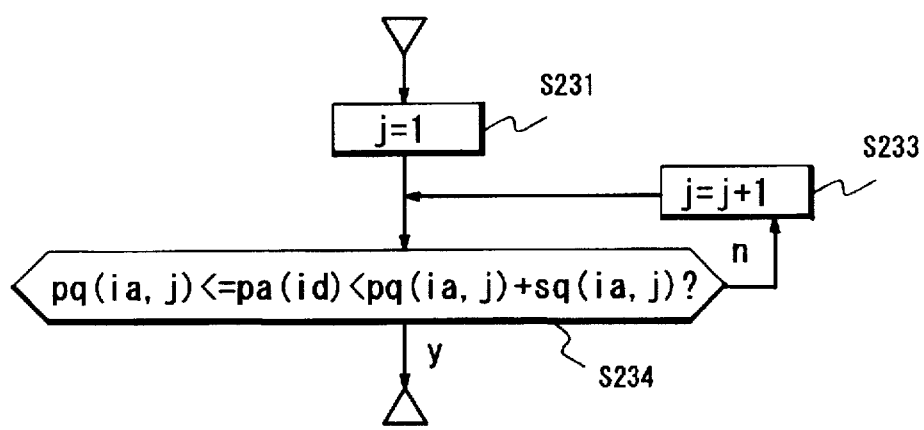

S231: $j=1$

S233: $j=j+1$

S234: $pq(ia, j) <= pa(id) < pq(ia, j) + sq(ia, j)?$

DATA SERVING APPARATUS WITH ACCESS REQUESTS QUANTIZED INTO VARIABLE SIZE DATA AND TIME QUANTIZATION UNITS

BACKGROUND OF THE INVENTION

1. Field of the Invention

The present invention relates to a data serving system, and more particularly to a data serving system including a server apparatus with a storage apparatus and a plurality of terminal equipments connected to the server apparatus, wherein access requests issued from the plurality of terminal equipments are quantized to reduce the number of access requests.

2. Description of Related Art

In a conventional on-demand access system as one technique for controlling access to a server apparatus, specifically, a video data server apparatus in a data serving system, an access request generally includes a head position address of requested data in the storage apparatus and the number of blocks of the requested data , i.e., the block length. In response to the access request, the requested data is read out from the storage apparatus and transmitted to the request issuing terminal equipment. Thus, the desired data requested from the terminal equipment can be supplied to the terminal equipment with the shortest time. In this manner, all access requests to the storage apparatus of the server apparatus are handled separately and independently such that a time period from issuing of the individual access request from a terminal equipment to receiving of data, i.e., a response time, can be minimized.

Further, there is a near on-demand access system as another access control system for the server apparatus. In the near on-demand access system, upon request form a terminal equipment, only a portion of data continuously outputted from the storage apparatus is transmitted to the terminal equipment. Thus, the management of the storage apparatus to not to be effected by the number of access requests, is performed so that the number of terminal equipments permitted by the server apparatus can be increased. In this system, for instance, a video data is reproduced from the storage apparatus from the head portion for every predetermined time interval. When an access request is received from a terminal equipment, the reproduced video data is transmitted to the terminal equipment from the head portion when the video data is again reproduced. Therefore, the response time is determined based on the reproduction time interval, and access requests from a large number of terminal equipments can be handled.

Further, in Japanese Laid-Open Patent Disclosure (JP-A-Tokukaihei5-41858), the technique is disclosed in which the video data automatically starts to be reproduced at different times shifted by a predetermined time period, independent of requests from terminal equipments. In addition, in Japanese aid-Open Patent Disclosure (JP-A-Tokukaihei6-214867), the technique is disclosed in which the same data conventionally stored in a single storage apparatus is stored in a plurality of storage apparatus.

In this manner, in the on-demand access system of the conventional data access control system of the server apparatus, the more terminal equipments that are connected to the server apparatus, the more access requests are issued, i.e., in direct proportion. Therefore, there is a problem in that the response time becomes long and through-put is decreased due to limitations of data supply capability of the storage apparatus. On the other hand, in the near on-demand access system, since the video data is reproduced from the head portion every predetermined time interval, the requested data can be supplied regardless of the number of access requests from the terminal equipments. However, there is a problem in that the response time is long and a large storage capacity apparatus is required.

SUMMARY OF THE INVENTION

The present invention has, as an object, to provide a method and apparatus for serving data stably even if the number of terminal equipments increases.

Another object of the present invention is to provide a method and apparatus in which the number of access requests can be reduced with respect to at least one of time region and data region by quantizing the access requests.

Further another object of the present invention is to provide a method and apparatus in which the size of quantization unit can be changed or adjusted in accordance with the number of access requests.

Still another object of the present invention is to provide a method and apparatus in which an access request can be quantized even if the access request has two or more parameters for designated a data or the size of quantization unit is different from the size of data block stored in a storage apparatus.

It is also an object of the present invention to provide a method and apparatus in which an access request is quantized based on a sampling time or an issuing or received time of the access request.

In order to achieve an aspect of the present invention, a data delivery server apparatus to which a plurality of terminal equipments each having a unique identifier are connected, includes a storage section for storing a plurality of data, each of which comprises one or more data blocks; a quantizing section for receiving an access request as pre-quantization access request from each of the plurality of terminal equipment, the pre-quantization access request requesting a data stored in the storage section, and quantizing the access request to produce one or more post-quantization access requests associated with one or more data block of the data; a reducing section for producing a collective access request from the post-quantization access requests belonging to each of quantization regions of the quantizing section; an access section for accessing the storage section in accordance with each of the collective access requests to read out the corresponding data block from the storage section; and a delivery section for delivering the data block to the terminal equipments which have issued the pre-quantization access requests corresponding to each of the collective access request.

The quantizing section desirably includes at least one of a data region quantizing section for quantizing the pre-quantization access request with respect to a data region of the data and a time region quantizing section for quantizing the pre-quantization access request with respect to a time region. In a case where the quantizing section includes both the data and time region quantizing sections, the quantizing section may further include a receiving section for receiving each of the pre-quantization access requests, for determining whether the each pre-quantization access request needs quantization of the data region, and for by-passing the data region quantizing section to transfer each of the pre-quantization access requests to the time region quantizing section as the post-data-region-quantization access request when it is determined that each of the pre-quantization access requests does not need the data region quantization. Alternatively, the time region quantizing section may further include receiving a section for determining whether each of the pre-quantization access requests needs quantization of the data region, and for by-passing the data region quantizing section to transfer each of the post-time-region-quantization access requests to the reducing section as the post-quantization access request when it is determined that each of the pre-quantization access requests does not need the data region quantization.

In a case where the server apparatus further includes a translating section for translating a logical address of the collective access request into a physical address of the data block corresponding to the logical address to supply the physical address to the access section, it would become easy to produce the pre-quantization access request at the terminal equipments.

Further, if the quantizing section further comprises a monitor section for receiving the pre-quantization access requests and for monitoring the number of received pre-quantization access requests, a waiting time for a user at the terminal equipment can be reduced by adjusting at least one of a size of data region quantization unit and a size of time region quantization unit in accordance with the monitoring result of the monitor section.

In quantization, a size of a data region quantization unit in the data region quantizing section may be equal to that of data block in the storage section or different from that of data block in the storage section. In addition, the pre-quantization access request may have first and second parameters for designating the data. In this case, the pre-quantization access requests are grouped in accordance with the first parameters, and the second parameter designates a data position within the data corresponding to the group.

The time region quantization may be performed based on a predetermined sampling time interval or a time when the pre-quantization access is received.

In order to achieve another aspect of the present invention, a method of delivering a desired data in a server apparatus to which a plurality of terminal equipments each having a unique identifier are connected, includes the steps of:

receiving an access request as pre-quantization access request from each of the plurality of terminal equipment, the pre-quantization access request requesting a data stored in a storage unit;

quantizing the access request to produce one or more post-quantization access requests associated with one or more data block of the data;

reducing into a collective access request the post-quantization access requests belonging to each of quantization regions;

accessing the storage unit in accordance with each of the collective access requests to read out the corresponding data block from the storage unit; and delivering the data block to the terminal equipments which have issued the pre-quantization access requests corresponding to each of the collective access requests.

BRIEF DESCRIPTION OF THE DRAWINGS

FIG. 13 is a flow chart showing the detail of step S220 of the flow chart shown in FIG. 5 in the modification of data region quantizing section;

FIG. 14 is a flow chart showing the detail of step S230 of the flow chart shown in FIG. 5 in the modification of data region quantizing section;

DESCRIPTION OF THE PREFERRED EMBODIMENT

A data serving system according to the present invention will be described with reference to the accompanying drawings.

Figure 1:
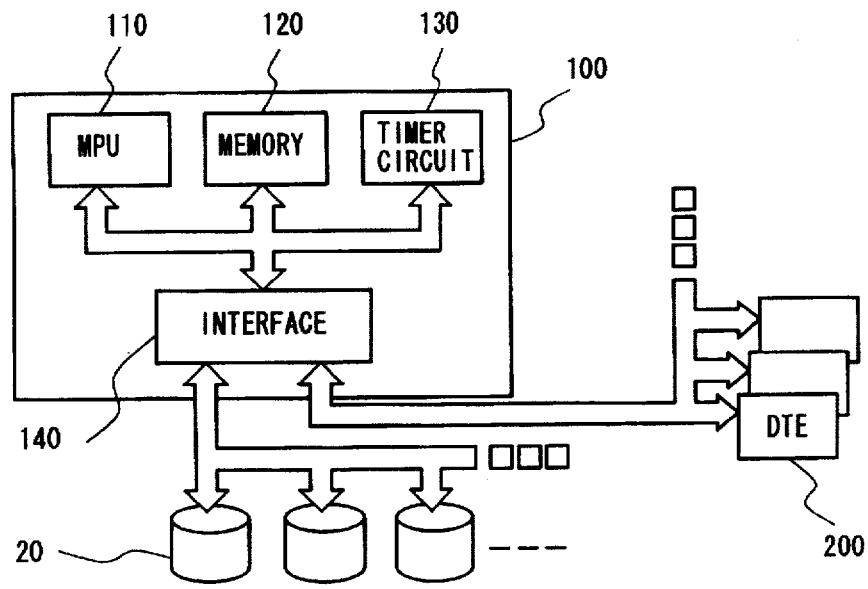
FIG. 1 is a block diagram of the data serving system of the present invention.

FIG. 1 is a block diagram of the data serving system according to the present invention. Referring to FIG. 1, the data serving system is composed of a server apparatus 100, a storage apparatus 20 connected to the server apparatus 100 and having a plurality of storage devices, and a plurality of terminal equipments 200 connected to the server apparatus 100 via a communication path. The server apparatus 100 is composed of a microprocessor unit (MPU) 110 for controlling the server apparatus, a memory 120 for storing data, requests and instructions, a timer circuit 130 for counting time, and an interface section 140 for interfacing the MPU 110 and terminal equipments 200.

Figure 2B:
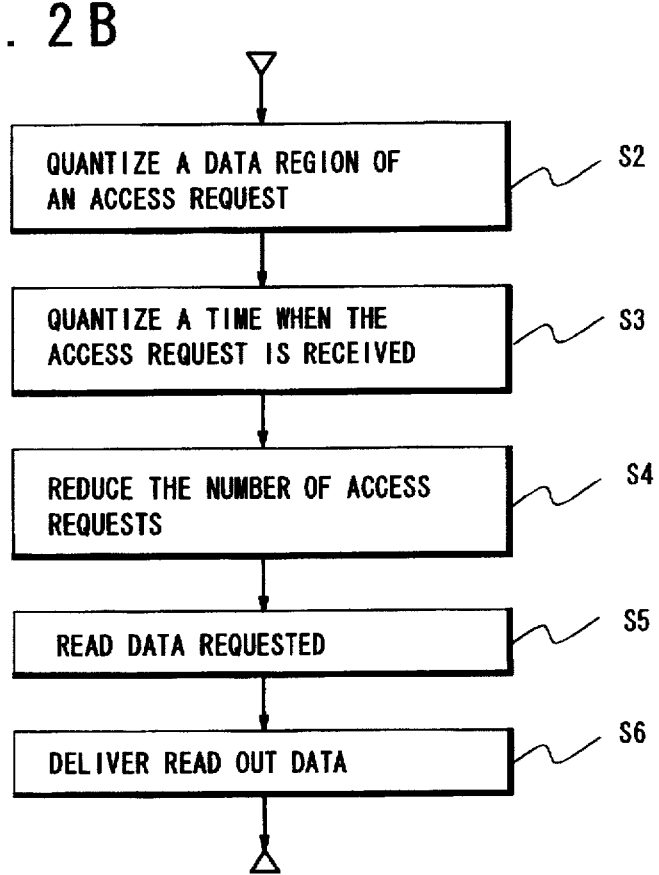
FIG. 2B is a flow chart of the operation of server apparatus shown in FIG. 2A.
Figure 2A:
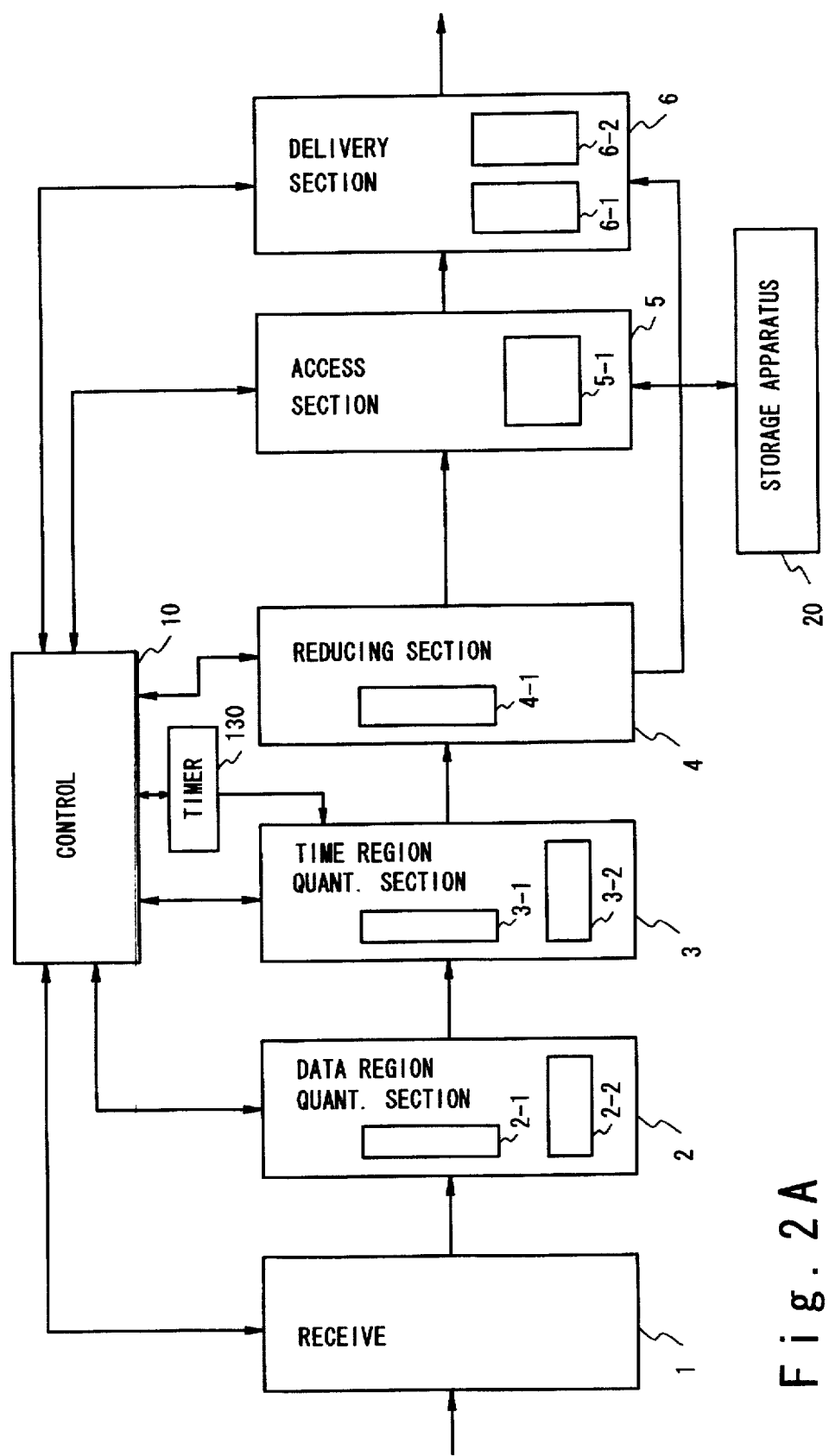
FIG. 2A is a functional block diagram of a server apparatus of the data serving system according to a first embodiment of the present invention.

FIG. 2A is a functional block diagram of the server apparatus 100 and FIG. 2B is a flow chart of the operation of the server apparatus 100. The server apparatus 100 is functionally composed of a receiving section 1 for receiving access request, a data region quantizing section 2 having a queue 2-1 and a table 2—2 storing data region quantization unit(s) corresponding to data stored in the storage apparatus 20, a time region quantizing section 3 having a queue 3-1 for access requests and a table 3-2 storing time region quantization unit(s), an access request reducing section 4 having a queue 4-1, an access section 5 having a queue 5-1 and connected to the storage apparatus 20, and a delivery section 6 having a table 6-1 and a data area 6-2, the timer circuit 130, and a control section 10. The data region quantizing section 2 quantizes an access request with respect to a data region based on the data region quantization units stored in the table 2—2 (step S2 of FIG. 2B) and stores the post-data-region-quantization access requests in the queue 3-1. The time region quantizing section 3 quantizes an access request with respect to the time region based on the time region quantization units stored in the table 3-2 (step) and stores the post-quantization access requests in the queue 4-1. The access request reducing section 4 produces a single access request from one or more access requests (step 54). That is, the access request reducing section 4 chooses one access request from the access requests or generates a single access request from the access requests and stores the collective access requests in the queue 5-1 and the identifiers of terminal equipments in the table 6-1. The access section 5 accesses the storage apparatus 20 to read out data from the storage apparatus 20 (step 55) and supplies it to the storage area 6-2. The delivery section 6-2 stores the data read out from the storage apparatus 20 in the data area 6-2 and delivers it to terminal equipments 200 which have issued the access requests (step 56). The storage apparatus 20 is composed of a plurality of storage devices. The peripheral storage devices such as a hard disk, electromagnetic disk, CD-ROM, magnetic tape are applicable as the storage apparatus. The above sections 1 to 6 and 10 are implemented by software of the computer 110 in the embodiment of FIG. 1. However, the invention is not limited to this arrangement and these sections may be constituted by hardware.

Next, the server apparatus 100 according to a first embodiment of the present invention will be described below.

(1) RECEIVING SECTION 1

The receiving section 1 receives access requests from terminal equipments 200 and stores them as pre-quantization access requests in the queue 2-1 of the data region quantizing section 2.

(2) DATA REGION QUANTIZING SECTION 2

Figure 3:
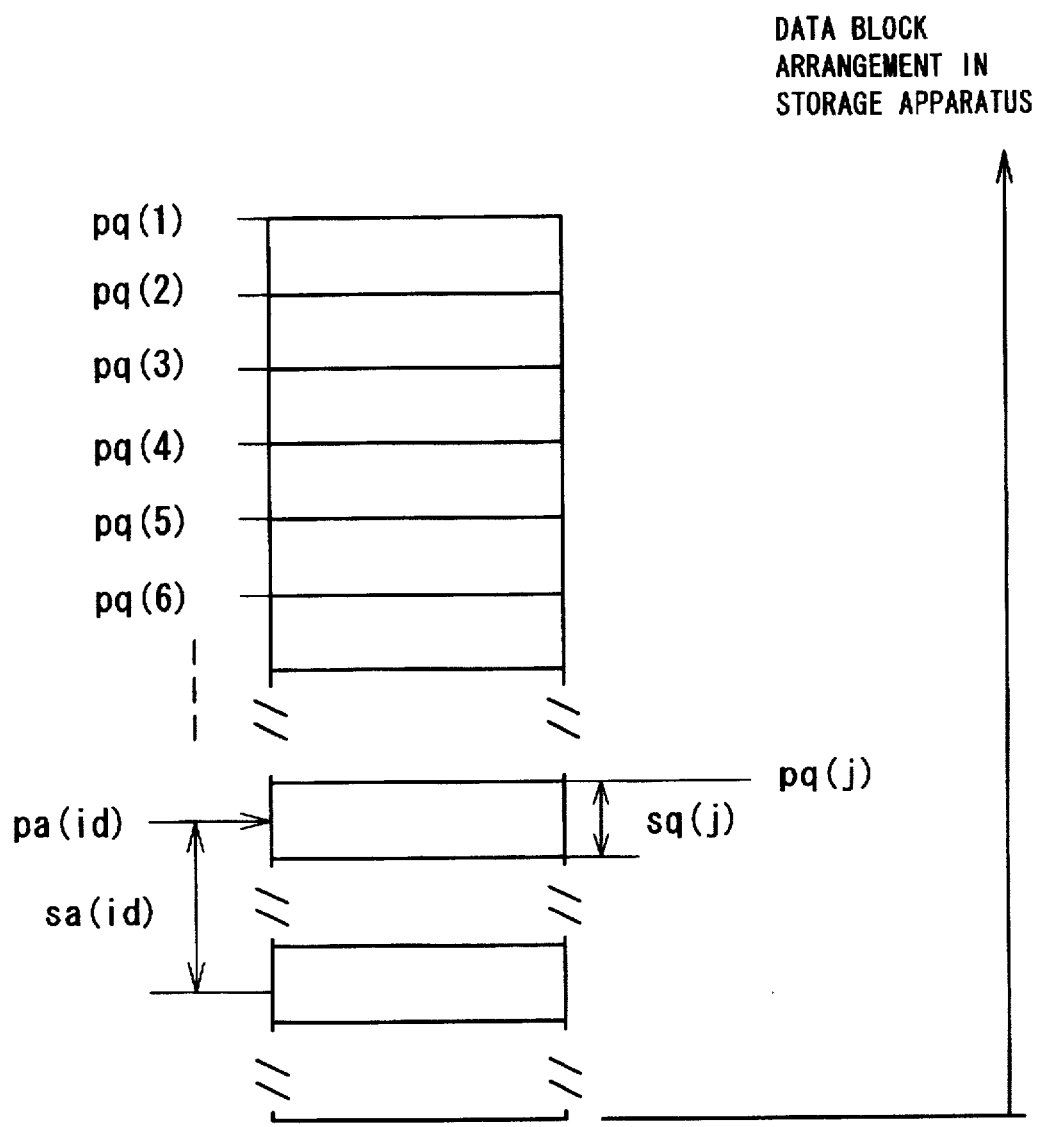
FIG. 3 is a diagram illustrating a relation of an access request issued from a terminal equipment and a data region quantization unit of a data stored in a storage apparatus in a data region quantizing section of the server apparatus shown in FIG. 2A.

The data region quantizing section according to the first embodiment will be described below. Prior to the description, terms and symbols are defined using FIGS. 3 and 4. FIG. 3 shows a relation of a pre-quantization access request before data region quantization and a data arrangement on the storage apparatus 20. Referring to FIG. 3, "id" is an identifier for distinguishing a pre-quantization access request. That is, a unique identifier id is provided to each of the pre-quantization access requests. A number may be used as the identifier. Alternatively, a head address of the queue 2-1 on a memory 120 in which parameters of the pre-quantization access request are stored or an index of one corresponding to the access request of variable areas of an array type which are prepared on the memory 120 may be used as the identifier. The access request id is one specific access request identified by the identifier id. The following symbols are also defined using the identifier id as to the pre-quantization access request id as shown in FIG. 3:

- pa(id): the head position of a desired data requested by the pre-quantization access request id; and
- sa(id): a data length of the desired data requested by the pre-quantization access request id.

Each of data blocks of data stored in the storage apparatus 20 is referred to as a data region quantization unit in the data region quantization. The following symbols are defined on the data region quantization unit as shown in FIG. 3:

- pq(j): the head position of the j-th data region quantization unit; and
- sq(j): the block length of the j-th data region quantization unit.

Figure 4:
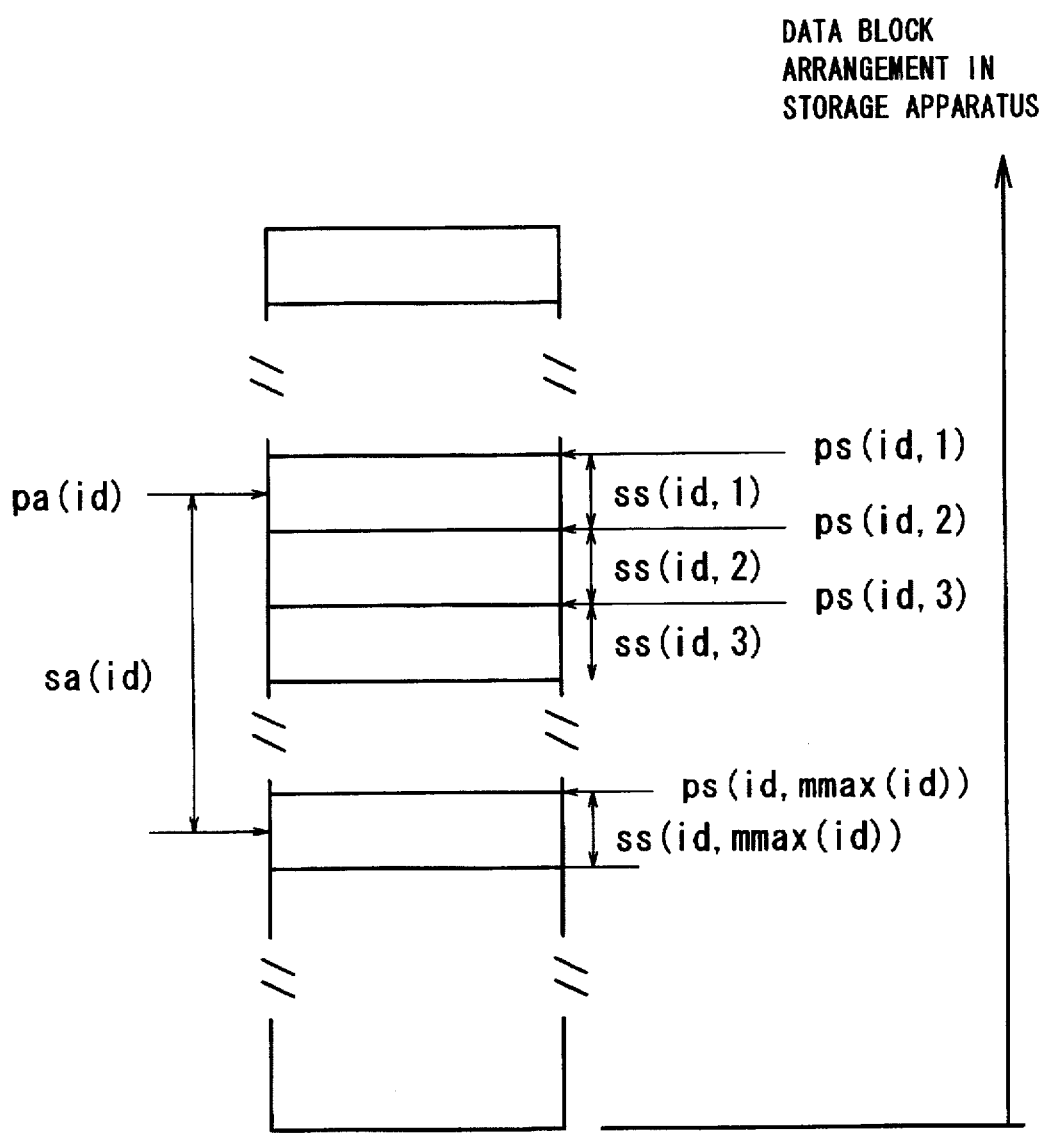
FIG. 4 is a diagram illustrating a relation of post-data-region-quantization access requests and the data stored in the storage apparatus in the data region quantizing section of FIG. 3.

FIG. 4 shows an example of post-data-region-quantization access request obtained by quantizing the pre-quantization access request from the terminal equipment 200 by the data region quantizing section 2 of the server apparatus 100. Referring to FIG. 4, a plurality of post-data-region-quantization access requests are generated from the pre-quantization access request id through the data region quantization of the pre-quantization access request id. A parameter of the m-th one among the plurality of post-data-region-quantization access requests is defined as follows:

- ps(id, m): the head position address of the m-th data block of the desired data designated by the m-th post-data-region-quantization access request obtained from the pre-quantization access request id; and
- ss(id, m): the block length of the m-th data block of the desired data designated by the m-th post-data-region-quantization access request obtained from the pre-quantization access request id
- mmax(id): a total number of post-data-region-quantization access requests obtained by quantizing the pre-quantization access request id.

It should be noted that a total data region of data blocks designated by the head position ps(id, m) and block length ss(id, m), that is, a data region obtained by adding a data block designated by the head position ps(id, m) and block length ss(id, m) over 1 to mmax(id) as to m can cover the data region requested by the pre-quantization access request id from the terminal equipment 200 and designated by the head block pa(id) and block count sa(id).

Next, symbols not shown in the figure will be defined. In order to deliver data acquired from the storage apparatus 20, a unique identifier is assigned to each of the terminal equipments 200 which has issued the pre-quantization access request id such that the identifiers can be distinguished before and after the data region quantization as follows:

- ca(id): an identifier of a terminal equipment which has issued the pre-quantization access request id; and
- cs(id, m): an identifier of a terminal equipment corresponding to the m-th post-data-region-quantization access request obtained by data-region-quantizing the pre-quantization access request id.

The identifier of a terminal equipment 200 may be numeric. For instance, information such as an address which is used to identify the terminal equipment 200 by the interface 140.

Figure 5:
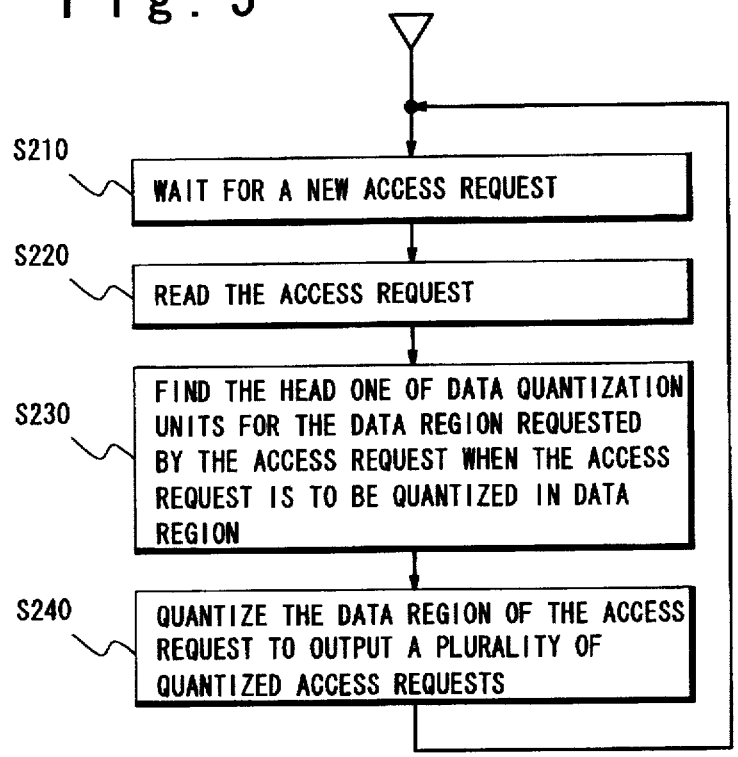
FIG. 5 is a flow chart of the operation of the data region quantizing section of the server apparatus according to the first embodiment of the present invention.

Using the above definitions of symbols, the configuration of the data region quantizing section 2 according to the first embodiment will be described. FIG. 5 is a flow chart of the operation of first embodiment of the data region quantizing section 2 shown in FIG. 2A. As shown in FIG. 5, the server apparatus 100 waits for a new access request at a step S210. When the new access request is received by the receiving section 1, the access request, i.e., the access request before data region quantization, is stored as the pre-quantization access request in the queue 2-1 of the data region quantizing section 2. Subsequently, the pre-quantization access request is read by the section 2 and data region quantization units corresponding to the access request are determined in step S230, including the head data quantization unit. The data region for the access request is quantized based on the determined data region quantization units at a step S240. At the same time, a plurality of post-data-region-quantization access requests are calculated and generated in correspondence to the determined data quantization units at the step 240. The processing of the data region quantizing section 2 is completed and waits for another new access request again at the step S210. Although it is shown in FIG. 5 that the processes of the data region quantizing section 2 are always executed in parallel, it would be apparent to a skilled person in the art that it is possible to achieve the present invention by a method in which the series of steps S210, S220, S230, and S240 of FIG. 5 is sequentially executed.

Next, the details of the steps S220, S230 and S240 of FIG. 5 in the first embodiment of the data region quantizing section 2 will be described below with reference to FIGS. 6, 7 and 8.

Figure 6:
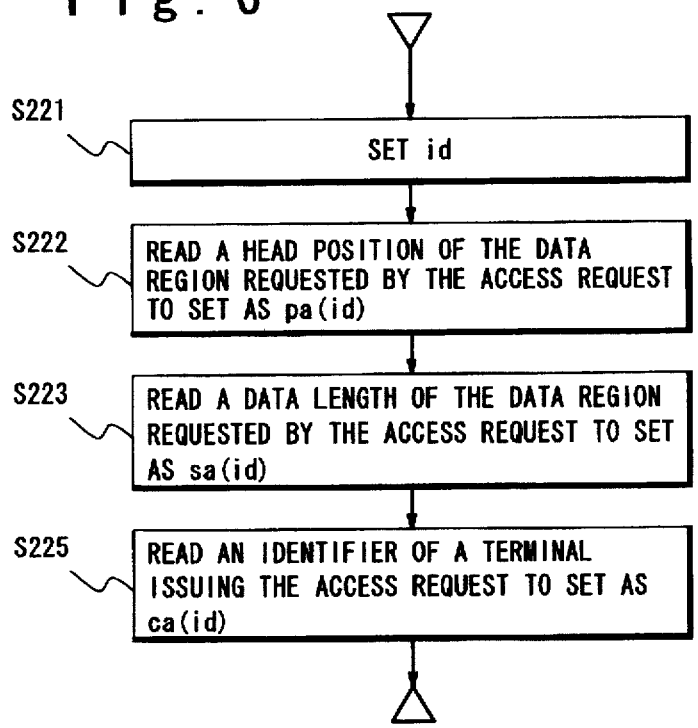
FIG. 6 is a flow chart showing the detail of step S220 of the flow chart shown in FIG. 5.

FIG. 6 is a flow chart of the detail of the step S220 of FIG. 5 executed by the data region quantizing section 2. Referring to FIG. 6, an identifier id not currently used is set at a step S221. Then, the following processing is performed to a new pre-quantization access request. More particularly, the head position of the data requested by the pre-quantization access request is read and set as pa(id) at a step S222, and the data length of the data requested is read and set as sa(id) at a step S223. Further, an identifier of a terminal equipment 200 which has issued the pre-quantization access request is read and set as ca(id) at a step S225.

Figure 7:
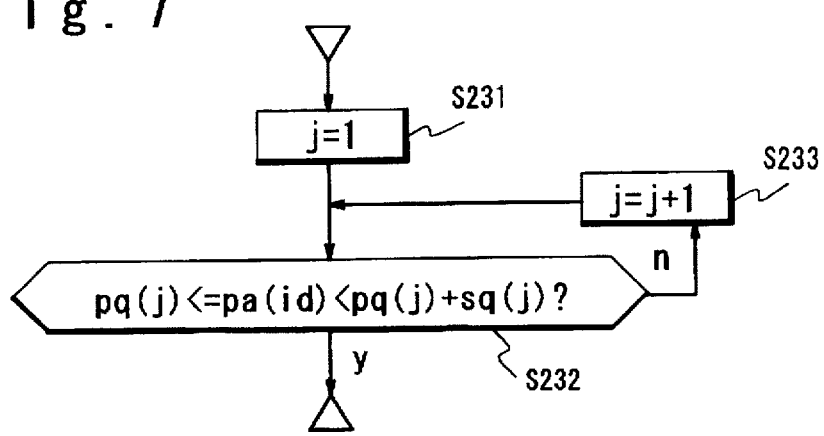
FIG. 7 is a flow chart showing the detail of step S230 of the flow chart shown in FIG. 5.

FIG. 7 is a flow chart of the detail of step S230 of FIG. 5 executed by the data region quantizing section 2. Referring to FIG. 7, an initial value is first set to a variable j at a step S231. Then, it is determined at a step S232 whether the head position pa(id) is included in a data region quantization unit designated by the head position pq(j) of the j-th data block and block length sq(j) of the j-th data block. If not included, the variable j is incremented by "1" at a step S233 and then the step S232 is executed again. If it is determined that the data region quantization unit includes the head position pa(id), the process is ended.

Figure 8:
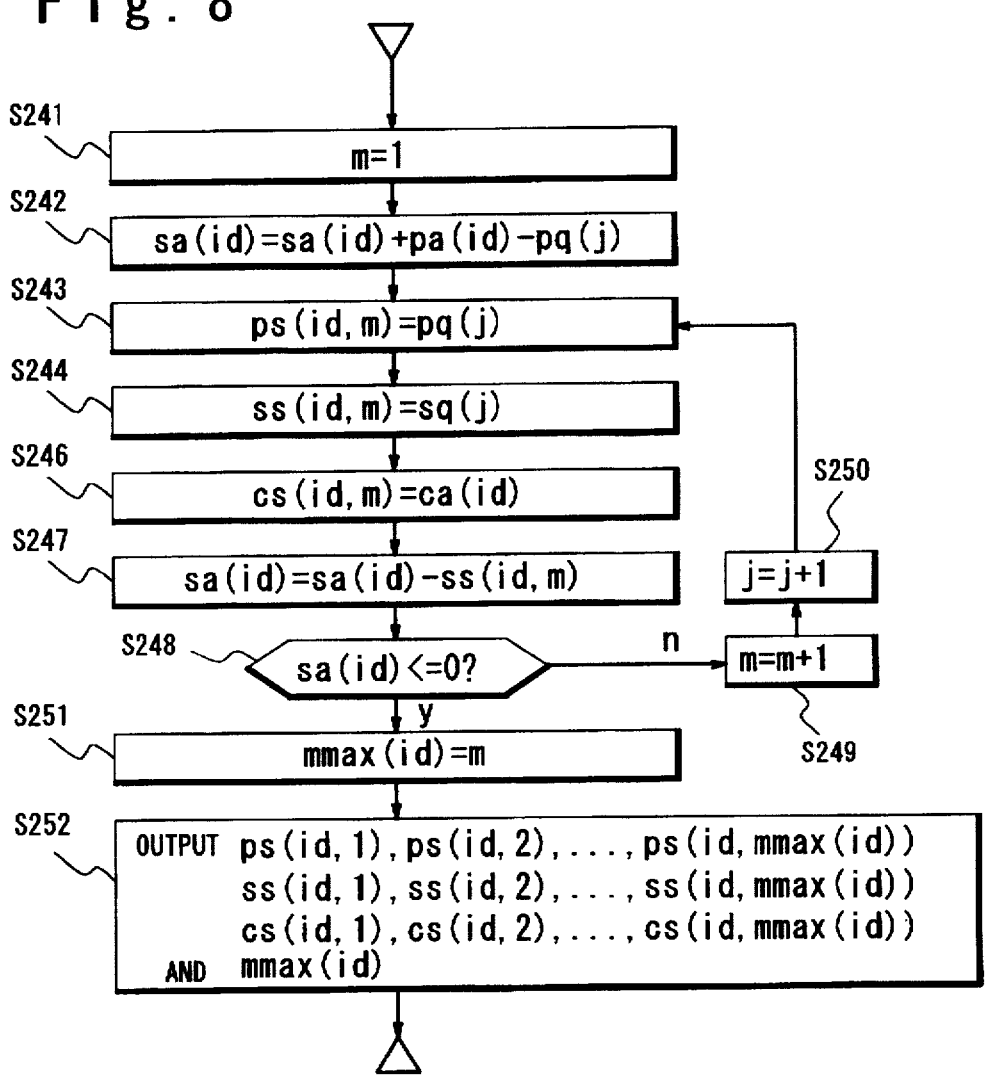
FIG. 8 is a flow chart showing the detail of step S240 of the flow chart shown in FIG. 5.

FIG. 8 is a flow chart of the detail of step S240 of FIG. 5. Referring to FIG. 8, a value "1" is first set to variable m at a step S241 for initialization. Then, a difference between the head position pa(id) for the pre-quantization access request and the head position pq(j) for the post-data-region-quantization access request is added to the data length sa(id) for the pre-quantization access request id and the added result is set to sa(id) at a step S242. Subsequently, the head position pq(j) of data region quantization units (blocks)for the desired data region requested by the pre-quantization access request id and the block length of the head data block for the desired data region are set to ps(id, m) and ss(id, m) at steps S243 and S244, respectively. Then, the identifier ca(id) of the terminal equipment 200 which has issued the pre-quantization access request id is set to cs(id, m) at a step S246. Next, In order to ensure that the data region requested by the pre-quantization access request id is covered by the post-data-region-quantization access requests, the result when ss(id, m) is subtracted from sa(id) is set to sa(id) at a step S247 and it is determined at a step S248 whether sa(id) is smaller than "0". If sa(id) >"0", the variables m and j are incremented by "1" at steps S249 and S250. Then the steps S243, S243, S246, S247 and S248 are repeated. If sa(id) ≦"0", a value, mmax(id) is set to m at a step S251. At a step S252, the head positions ps(id, 1), ps(id, 2), . . . , ps(id, mmax(id)) and block lengths ss(id, 1), ss(id, 2), . . . , ss(id, mmax(id)) of the post-data-region-quantization access requests, and the identifiers cs(id, 1), cs(id, 2), . . . , cs(id, mmax(id)) of the terminal equipment 200 which has issued the pre-quantization access request corresponding to the post-data-region-quantization access requests are outputted to the queue 3-1 of the time region quantizing section 3 in addition to mmax(id). Through the above procedure, a set of post-data-region-quantization access requests, ps(id, m), ss(id, m) and cs(id, m) (m=1, 2, . . . , mmax(id)) are obtained to cover the data region requested by the pre-quantization access request.

A first modification of the data region quantizing section 2 will be described below. In the first embodiment of the data region quantizing section 2, the access request position, i.e., the head data position is designated by one parameter of the access request such as the parameter pa(id). However, the access request position may be designated by use of two or more parameters for the reason of operability and utility of programming. In the first modification the data region quantizing section, the access request position is designated by two parameters i.e., a first parameter and second parameter. In this case, a set of access request positions is classified into some groups, one group being designated by the first parameter and a more specific access request position being designated within the designated group by the second parameter. In a case where an access request position is designated by three or more parameters, access request positions could be classified into groups and hierarchically designated using the three or more parameters.

Figure 9:
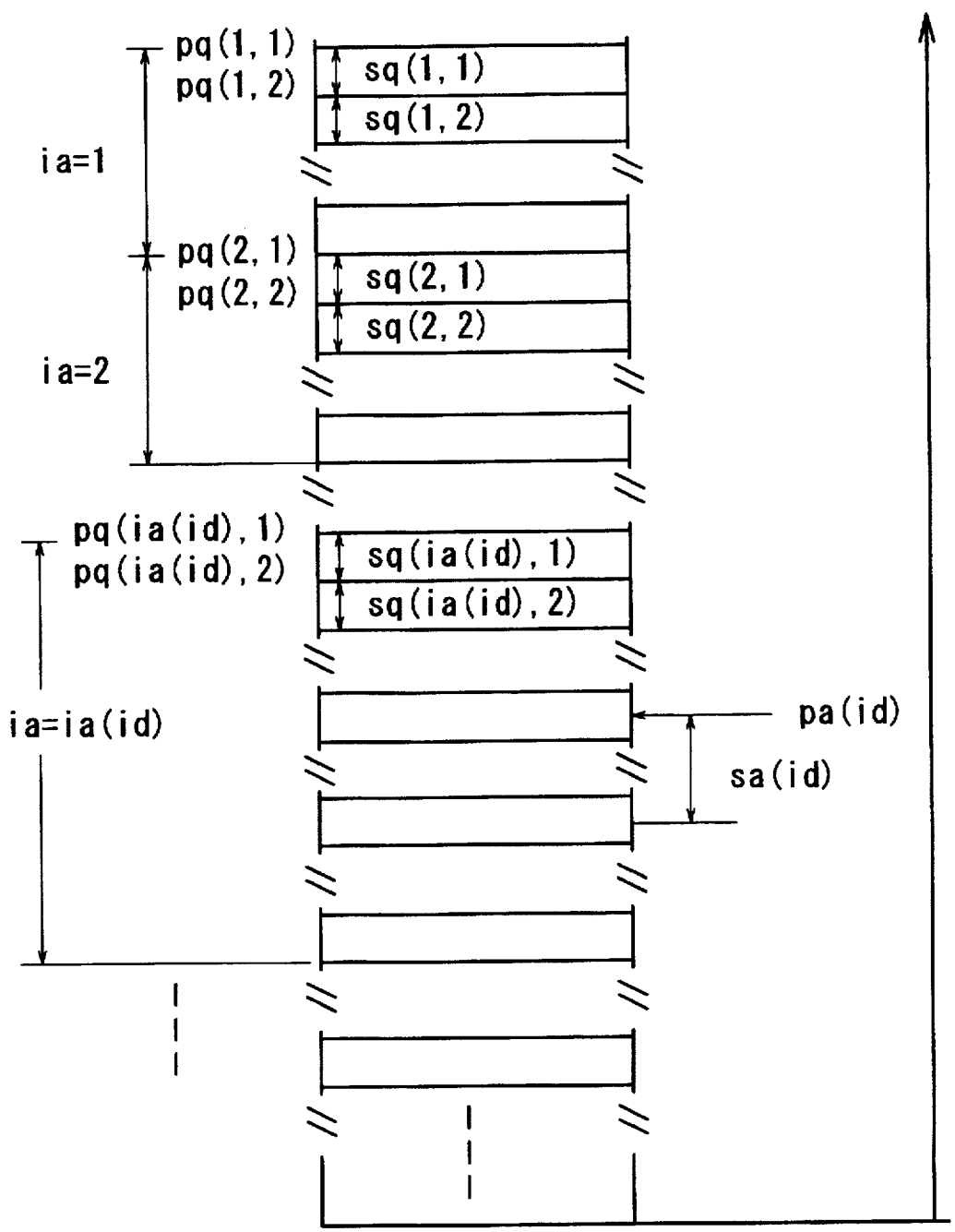
FIG. 9 is a diagram illustrating a relation of an access request issued from a terminal equipment and a data region quantization unit of a data stored in the storage apparatus in a modification of data region quantizing section of the server apparatus shown in FIG. 2A.

In the first modification the data region quantizing section 2, the access request position is designated by two parameters, i.e., a first parameter for designating one of the groups of data quantization units and the second parameter for designating the head access request position within the designated group of data quantization units. FIG. 9 shows the relation of an access request issued from a terminal equipment 200 and groups of data quantization units in the second embodiment of the access request region quantizing section 2. Referring to FIG. 9, data quantization units are classified in accordance with groups, each of which corresponds to data in the storage apparatus 20. For example, video data is arranged and stored in the storage apparatus 20 depending on the title. An access request issued from a terminal equipment 200 designates a data region of a group. In this case, the following symbols are defined in addition to the symbols described in conjunction with FIG. 3:

ia : an identifier of a group of data region quantization units; and ia(id): an identifier of a group of data region quantization units designated by the pre-quantization access request id.

Further, the following symbols are defined in place of pq(j) and sq(j) defined in conjunction with FIG. 3:

pq(i, j): the head position of the j-th data region quantization unit (block) in a group i sq(i, j): the block length of the j-th data quantization unit in the group i.

Figure 10:
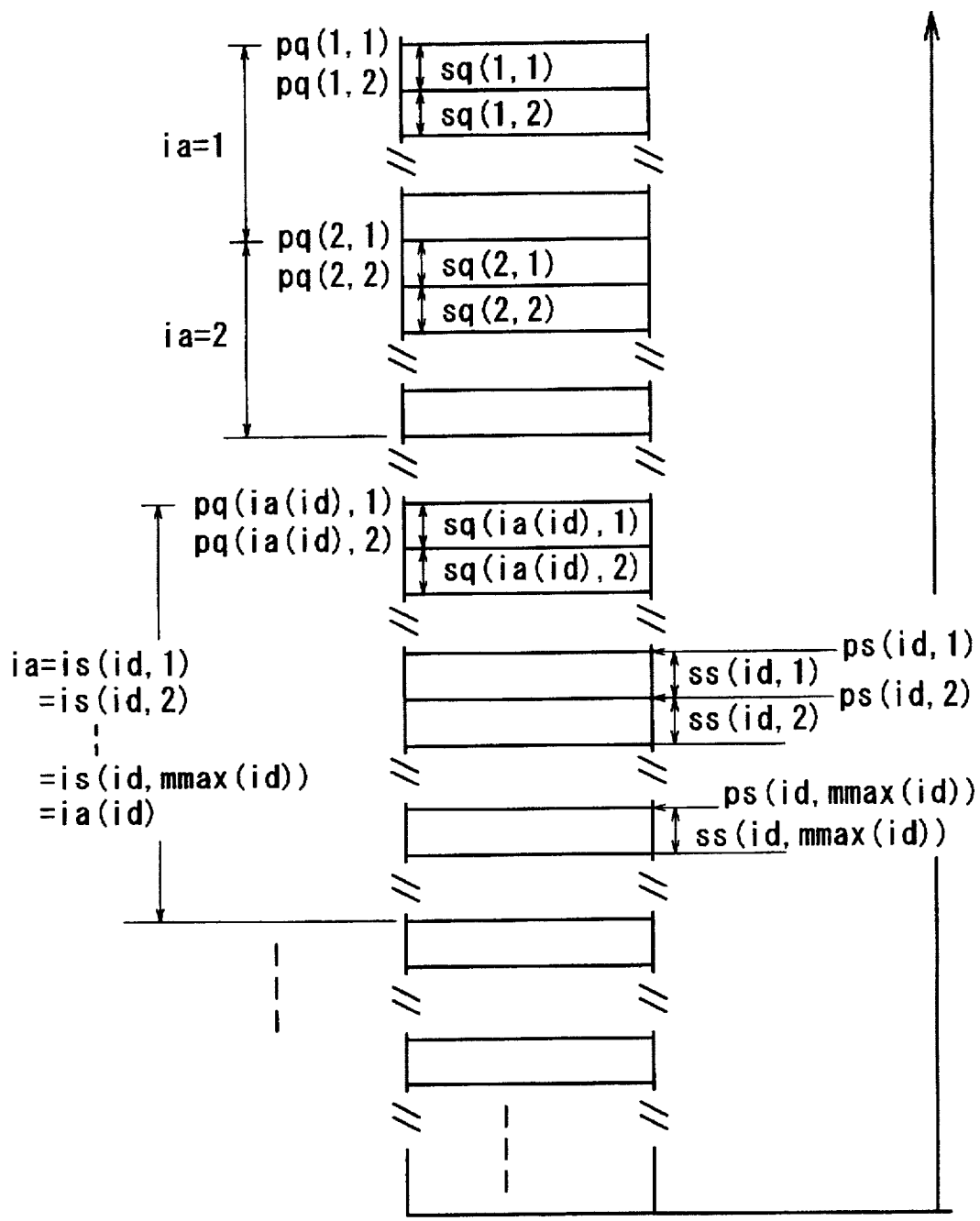
FIG. 10 is a diagram illustrating a relation of post-data-region-quantization access requests and the data stored in the storage apparatus in the modification of data region quantizing section of FIG. 9.

FIG. 10 shows a relation of an example of post-data-region-quantization access requests and symbols in the first modification of the access request quantizing section 2. In this example, the post-quantization access request designates not only a data region but also a group. For this reason, the following symbol is defined:

is(id, m): an identifier of a group of data region quantization units to be accessed by the m-th post-data-region-quantization access request.

Figure 11:
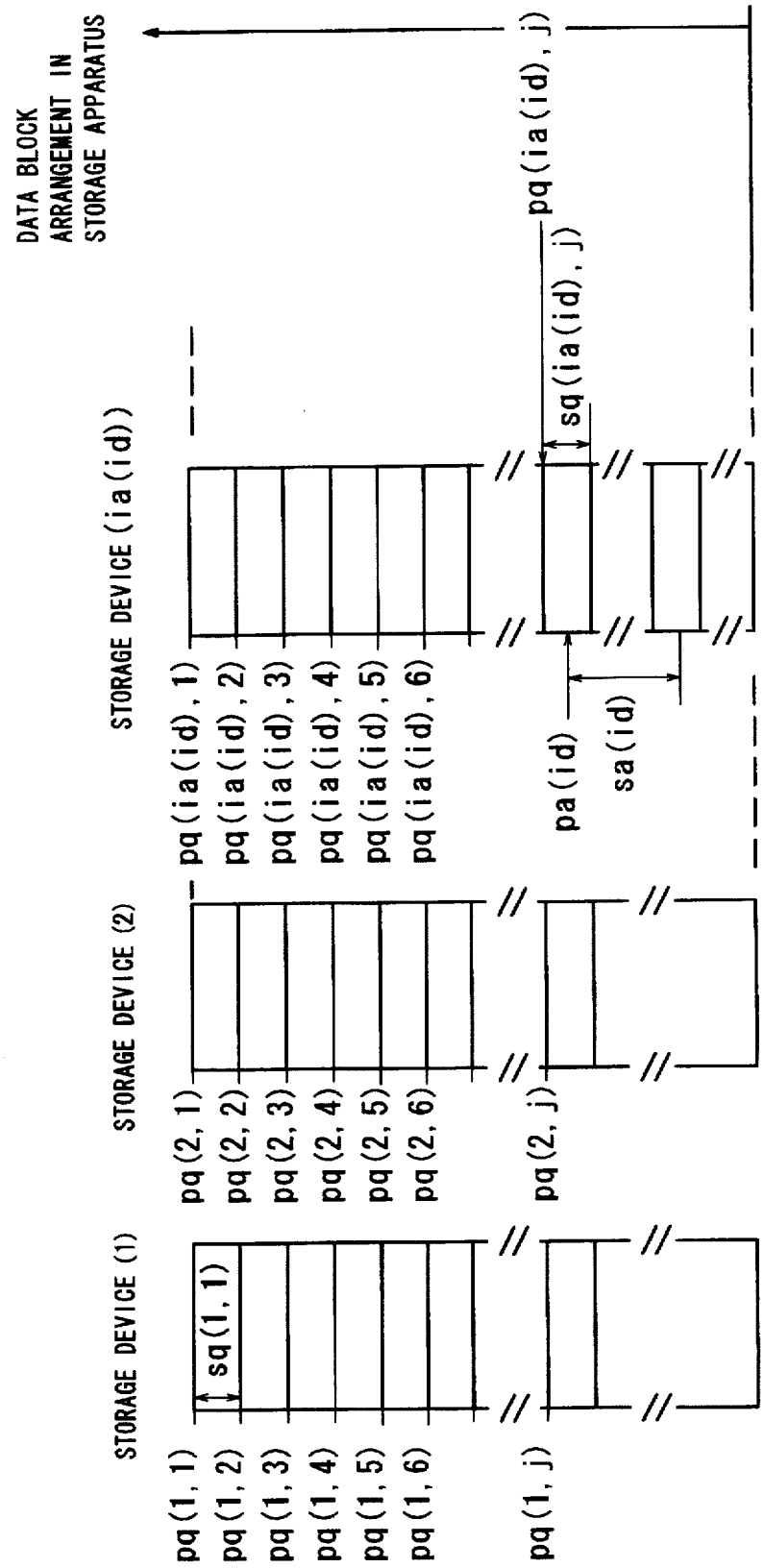
FIG. 11 is a diagram illustrating a relation of an access request issued from the terminal equipments to a plurality of storage units of the storage apparatus and a data region quantization unit of a data stored in the storage apparatus in the modification of data region quantizing section of the server apparatus shown in FIG. 2A.

FIG. 11 shows a relation of an access request issued from a terminal equipment 200 and data region quantization units in a case where each of the groups of data region quantization units corresponds to one of the physical storage devices of the storage apparatus 20. The definitions of the symbols are the same as in the description made in conjunction with FIG. 9.

Figure 12:
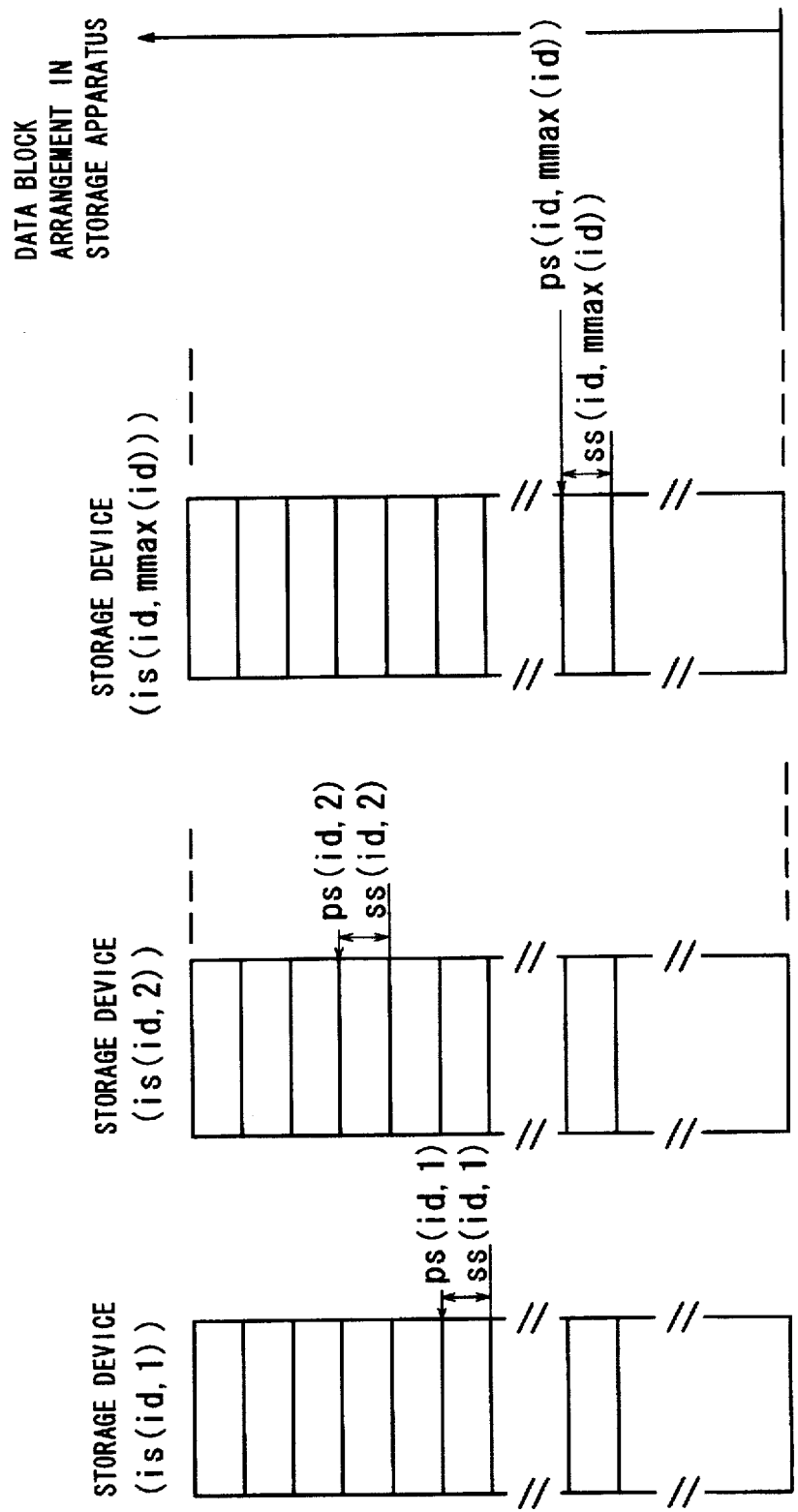
FIG. 12 is a diagram illustrating a relation of post-data-region-quantization access requests to the plurality of storage units and the data stored in the storage apparatus in the modification of data region quantizing section of FIG. 11.

FIG. 12 is an example of access request issued from a terminal equipment 200 and data quantization units in a case where the group of data quantization units corresponds to one physical storage apparatus. The definitions of the symbols are the same as in description in conjunction with FIG. 9.

FIG. 13 is a flow chart showing the detail of the step S220 in FIG. 5 in the first modification of the data region quantizing section 2. In the flow chart of the figure, an identifier of a group to be designated by the pre-quantization access request is read in as ia(id) in the step S224 as well as the parameters shown in FIG. 6.

FIG. 14 is a flow chart showing the detail of the step S230 in FIG. 5 in the first modification of the data region quantizing section 2. In the flow chart of the figure, the processing shown in a step S234 is performed in place of the step S232 of FIG. 7. At the step S232, it is determined whether pa(id) exists within the head block pq(j) of the desired data region having a block length sq(j) in the storage apparatus 20. However, at the step S234, it is determined whether pa(id) exists within the head block pq(ia, j) of the desired data region having a block length sq(ia, j) in the storage apparatus 20.

Figure 15:
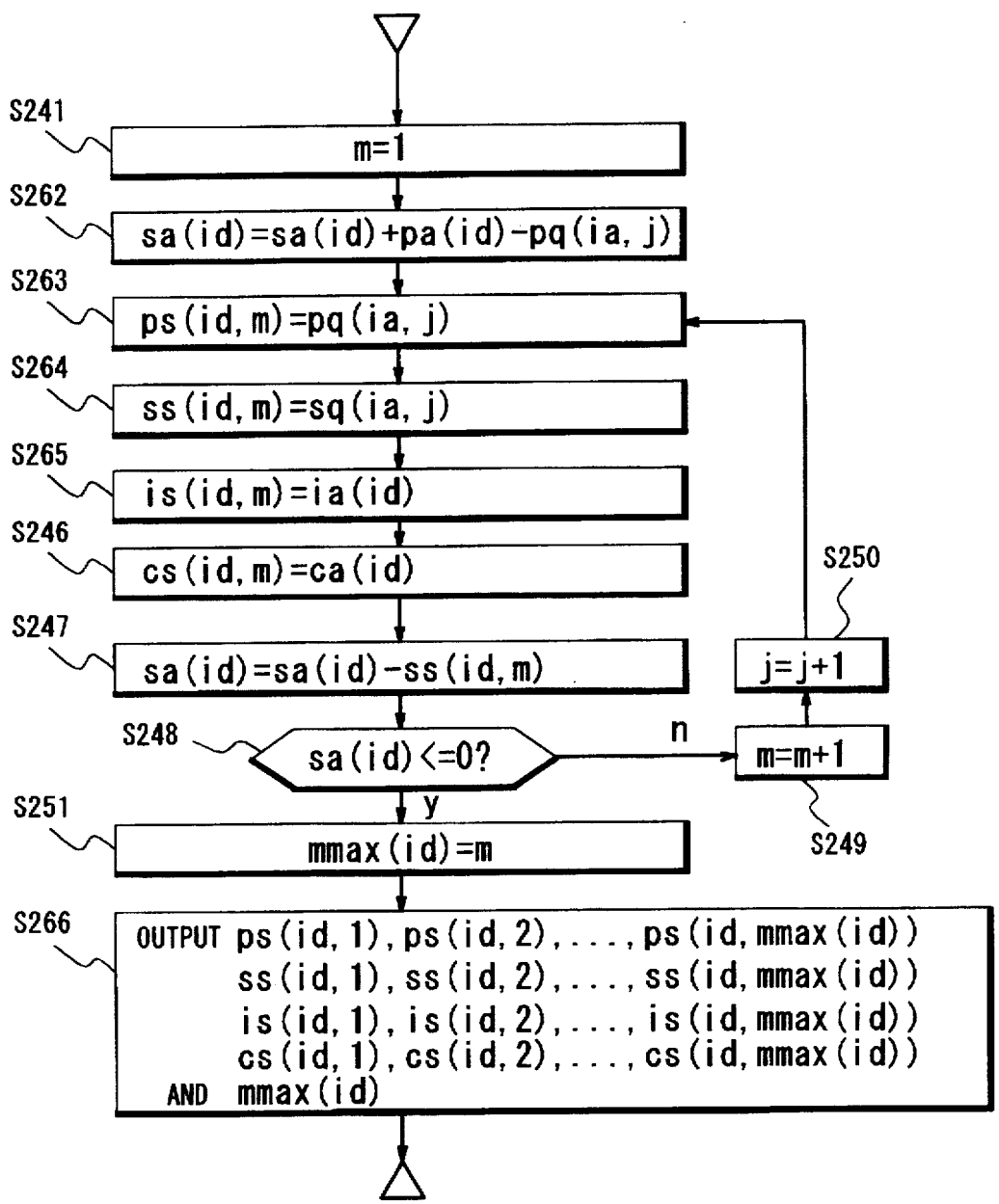
FIG. 15 is a flow chart showing the detail of step S240 of the flow chart shown in FIG. 5 in the modification of data region quantizing section.

FIG. 15 is a flow chart showing the detail of the step S240 of the FIG. 5 in the first modification of data region quantizing section 2. In the figure, pq(j) at the step S242 and S243 in FIG. 8 is replaced by pq(ia, j) at steps S262 and S263. Also, sq(j) at the step S244 is replaced by sq(ia, j) as a step S264. Further, ia(id) is set in place of is(id, m) at a step S265 executed after the step S264. Furthermore, a step S266 is executed in place of the step S252. At the step S266, identifiers of groups of data region quantization units designated by post-data-region-quantization access requests, is(id, 1), is(id, 2), . . . , is(id, mmax(id)) which are calculated at the step S265 are outputted to the time region quantizing section 3 in addition to the output of the step S252. Through the above procedure, sets of post-data-region-quantization access requests, the head positions ps(id, m) and block lengths ss(id, m) and the group identifiers is(id, m) and in-group identifiers cs(id, m) (m=1, 2, . . . , mmax(id)) which cover all the data region requested by the pre-quantization access request before the data region quantization can be obtained, as shown in FIGS. 10 and 12. The steps S246 to S251 of FIG. 15 are the same as those of FIG. 8.

In the first embodiment and first modification of the data region quantizing section 2, the size of each of the data quantization units used to quantize the pre-quantization access request is the same as that of data block designated by each of the post-data-region-quantization access requests. That is, each of the post-data-region-quantization access requests designates one of the data region quantization units as the reference for quantization of the access request. However, it is possible to increase the operability by employing data blocks designated by each post-data-region-quantization access request and having a different size from that the data region quantization units for the pre-quantization access request. The second modification the data region quantizing section 2 will be described with reference to FIGS. 16, 17 and 18. In the second modification the data region quantizing section 2 described below, the sizes of the data region quantization units used for quantization of the pre-quantization access request are different from those of data blocks of data regions stored in the storage apparatus 20. Each of the data blocks of the data regions stored in the storage apparatus 20 is referred to as a data storage unit whose size is the same as that of a data delivery unit.

Figure 16:
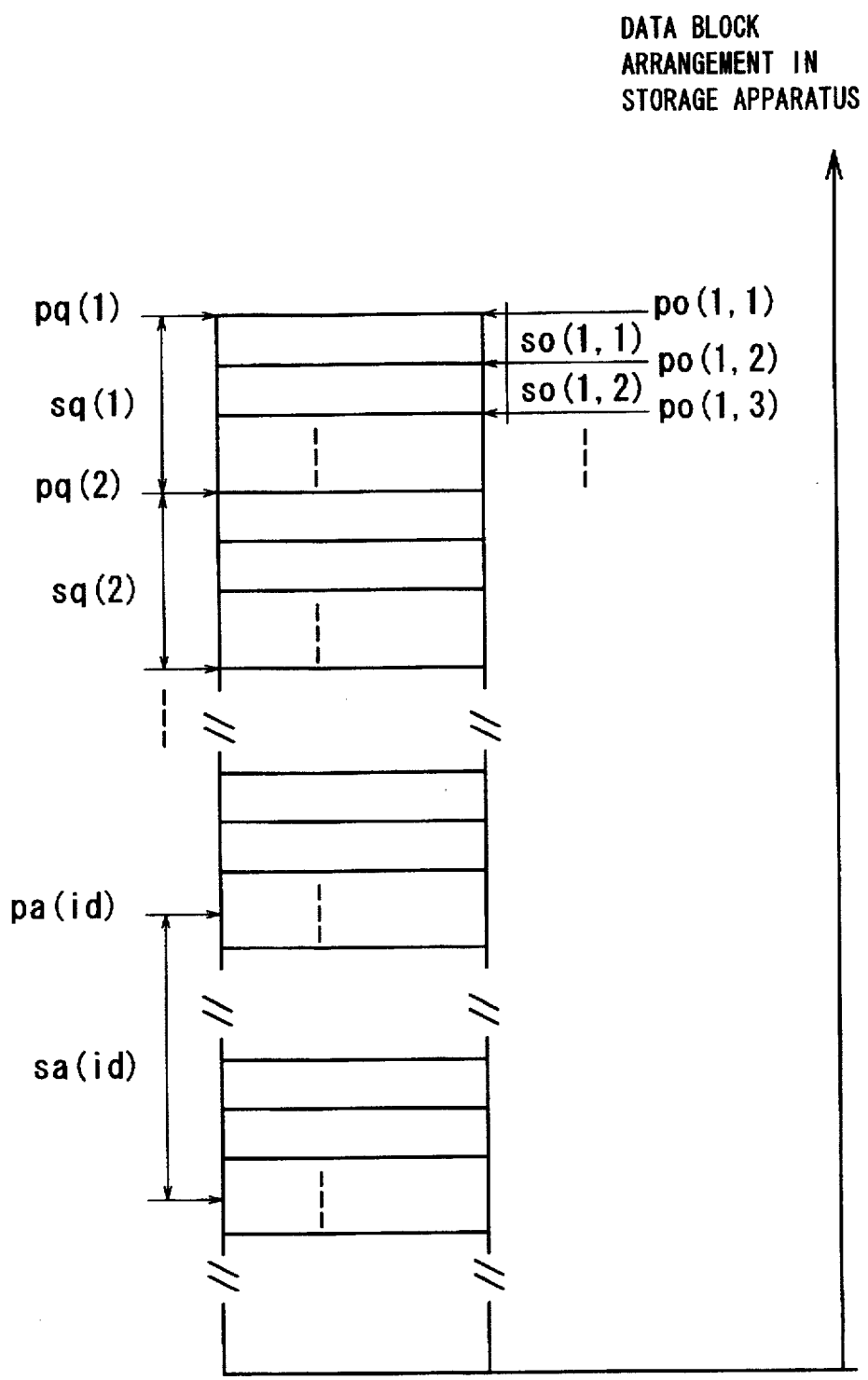
FIG. 16 is a diagram illustrating a relation of an access request issued from a terminal equipment and a data region quantization unit of a data stored in the storage apparatus in another modification of data region quantizing section of the server apparatus shown in FIG. 2A.

FIG. 16 is a diagram showing a relation of the pre-quantization access request issued from a terminal equipment 200 and data region quantization units in the second modification the data region quantizing section 2. Referring to FIG. 16, in addition to the head position pa(id) and data length sa(id) and the identifier ca(id), the head position pq(j) and block length sq(j) of data blocks which are defined in conjunction with FIG. 3, the following symbols are defined:

po(j, k): the head position of the k-th data storage (delivery) unit within the j-th data region quantization unit; and so(j, k): the block length of the k-th data storage (delivery) unit within the j-th data region quantization unit.

Further, the number of data delivery units within the j-th data region quantization unit is predetermined as follows:

kmax(j): the number of data storage (delivery) units within the j-th data region quantization unit.

Figure 17:
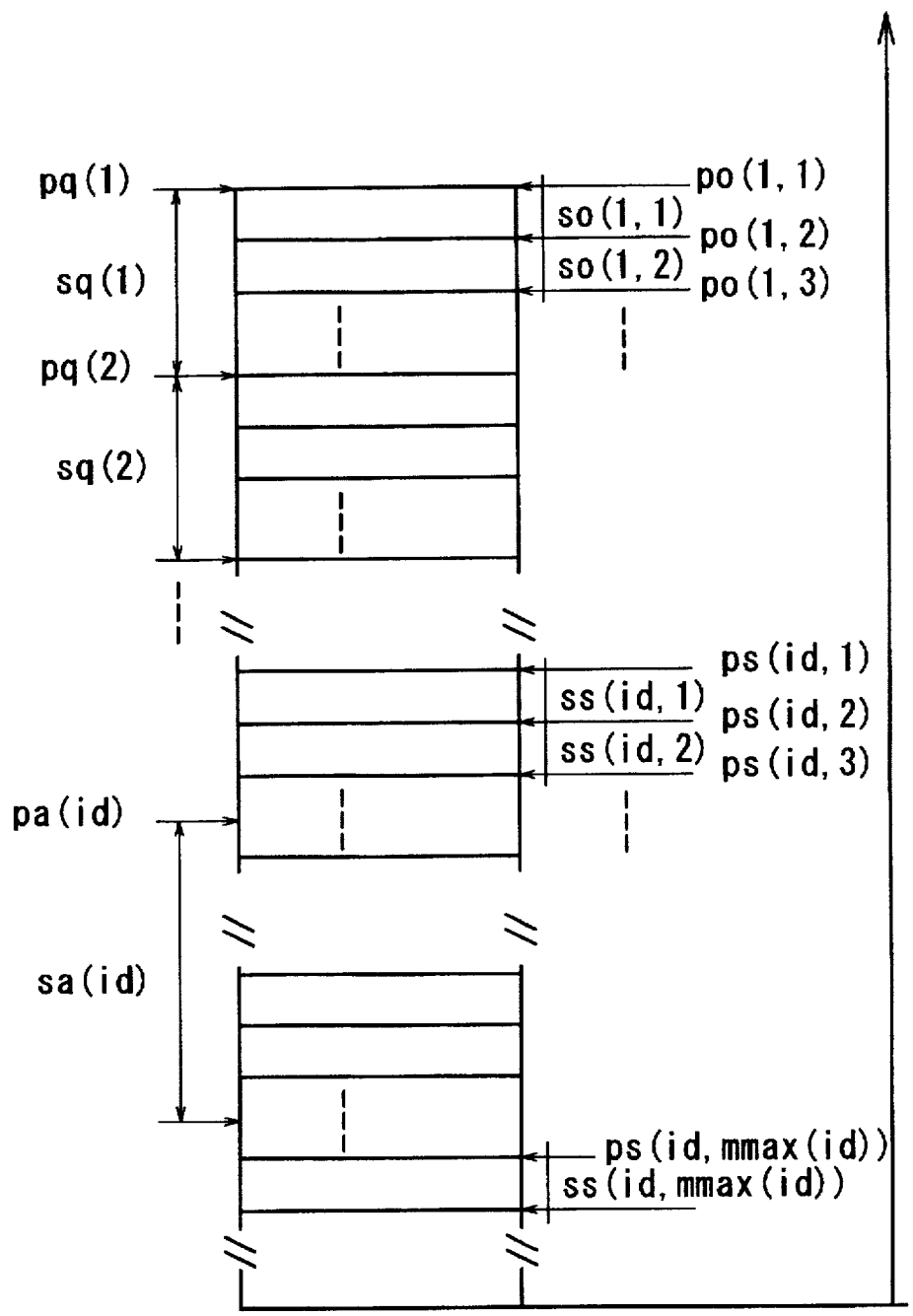
FIG. 17 is a diagram illustrating a relation of post-data-region-quantization access requests and the data stored in the storage apparatus in the other modification of data region quantizing section of FIG. 16.

FIG. 17 is a diagram showing a relation of the post-data-region-quantization access request and symbols in the second modification the data region quantizing section 2. Referring to FIG. 17, the head position ps(id, m) and block length ss(id, m), the identifier cs(id, m) and mmax(id) which are obtained as the result of quantization are the same as those obtained in FIG. 4.

Figure 18:
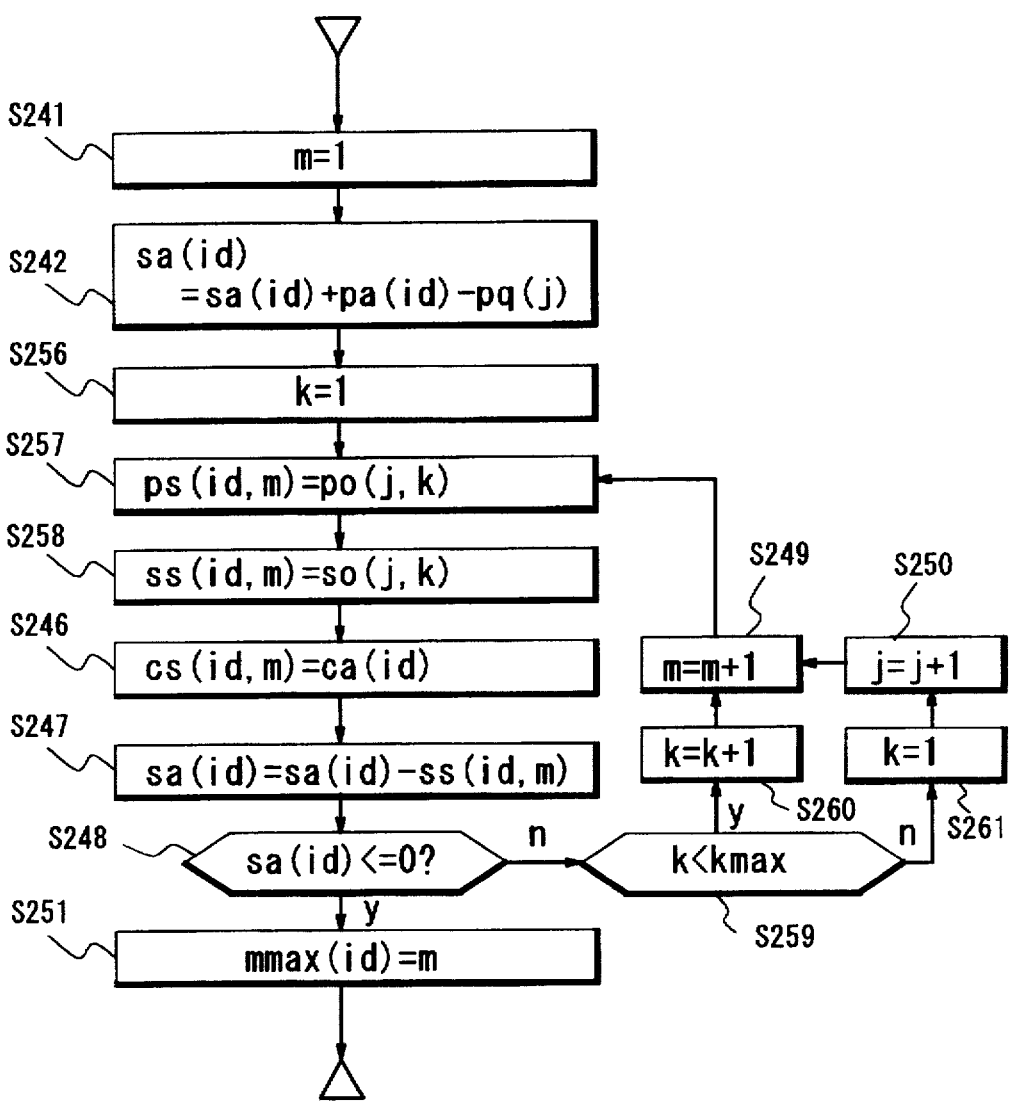
FIG. 18 is a flow chart showing the detail of step S240 of the flow chart shown in FIG. 5 in the other modification of data region quantizing section.

FIG. 18 is a flow chart of the step S240 in FIG. 5 in the second modification the data region quantizing section 2. Referring to FIG. 18, the head position pq(j) at the step S243 of FIG. 8 is replaced by the head position po(j, k) at a step S257, the block length sq(j) at the step S244 is replaced by the block length so(j, k) at a step S258. A value of "1" is substituted for k between the steps S242 and S257. Further, in a case where it is determined at the step S248 that the data length sa(id) is positive, the variables k and kmax(j) are compared with each other in magnitude at the step S259. If k is smaller than kmax(j), k is added with "1" at the step S260 and m is added with "1" at the step S249. If k is equal to or greater than kmax(j), a value of "1" is set to k at the step S261 and j is added with a value of "1" at the step S250. Thereafter, the step S257 is executed again. Through the above procedure, the set of post-data-region-quantization access requests, composed of ps(id, m) and ss(id, m) and is(id, m) and cs(id, m) (m=1, 2, . . . , mmax(id)), which cover the data region requested by the pre-quantization access request are obtained.

(3) TIME REGION QUANTIZING SECTION 3

The time region quantizing section 3 will be described below with reference to the accompanying drawings. Prior to the description, symbols and terms are defined. With the post-data-region-quantization access request quantized by the first embodiment and second modification of data region quantizing section 2, a combination of the head position ps(id, m) and block length ss(id, m) of the m-th post-data-region-quantization access request and the identifier cs(id, m) of a terminal which has issued the pre-quantization access request corresponding to the m-th post-data-region-quantization access request is represented by qs(id, m). Also, with the post-data-region-quantization access request quantized by the first modification of data region quantizing section 2, a combination of the head position ps(id, m) and block length ss(id, m) of the m-th post-data-region-quantization access request, the identifier cs(id, m) of a terminal which has issued the pre-quantization access request corresponding to the m-th post-data-region-quantization access request and the identifier is(id, m) of a group of data region quantization units associated with the m-th post-data-region-quantization access request is represented by qs(id, m). The access request qs(id, m) is the access request inputted to the time region quantizing section 3. Further, a combination of qs(id, 1), qs(id, 2), . . . , qs(id, mmax(id)) is represented by QSM(id) which is defined as a post-data-region-quantization access request set. That is, each element of the set QSM(id) denotes a post-data-region-quantization access request. Furthermore, the following symbols are defined:

t : a time as an output of a timer circuit 130;

ts: a sampling time;

to: an initial value of sampling time;

td: a time interval between sampling times; and

TQ(ts): sampling time from a time ts to a time ts+td.

A parameter bqs(id) is defined which has a TRUE value when at least one of the elements of the set QSM(id) is already transferred to the access request reducing section 4 within a time period TQ(ts) and has a FALSE value otherwise. The parameter is referred to as a post-time-regionquantization true and false value. The initial value of the parameter bqs(id) is FALSE. The total number of post-time-region-quantization access requests outputted from the time region quantizing section 3 within time period TQ(ts) is referred to as the number of post-time-region-quantization access requests and represented by mtmax(ts). In addition, the following symbols are defined as to the post-time-quantization access request:

pt(ts, mt): the head position of the data region designated by the m-th post-time-region-quantization access request quantized within a sampling time TQ(ts);

st(ts, mt): a block length of the data block designated by the m-th post-time-region-quantization access request quantized within a sampling time TQ(ts);

ct(ts, mt): an identifier of a terminal equipment which has issued a pre-quantization access request corresponding to the m-th post-time-region-quantization access request quantized within a sampling time TQ(ts); and it(ts, mt): an identifier of a group of data quantization units associated with the mth post-time-region-quantization access request quantized within a sampling time TQ(ts).

Figure 19:
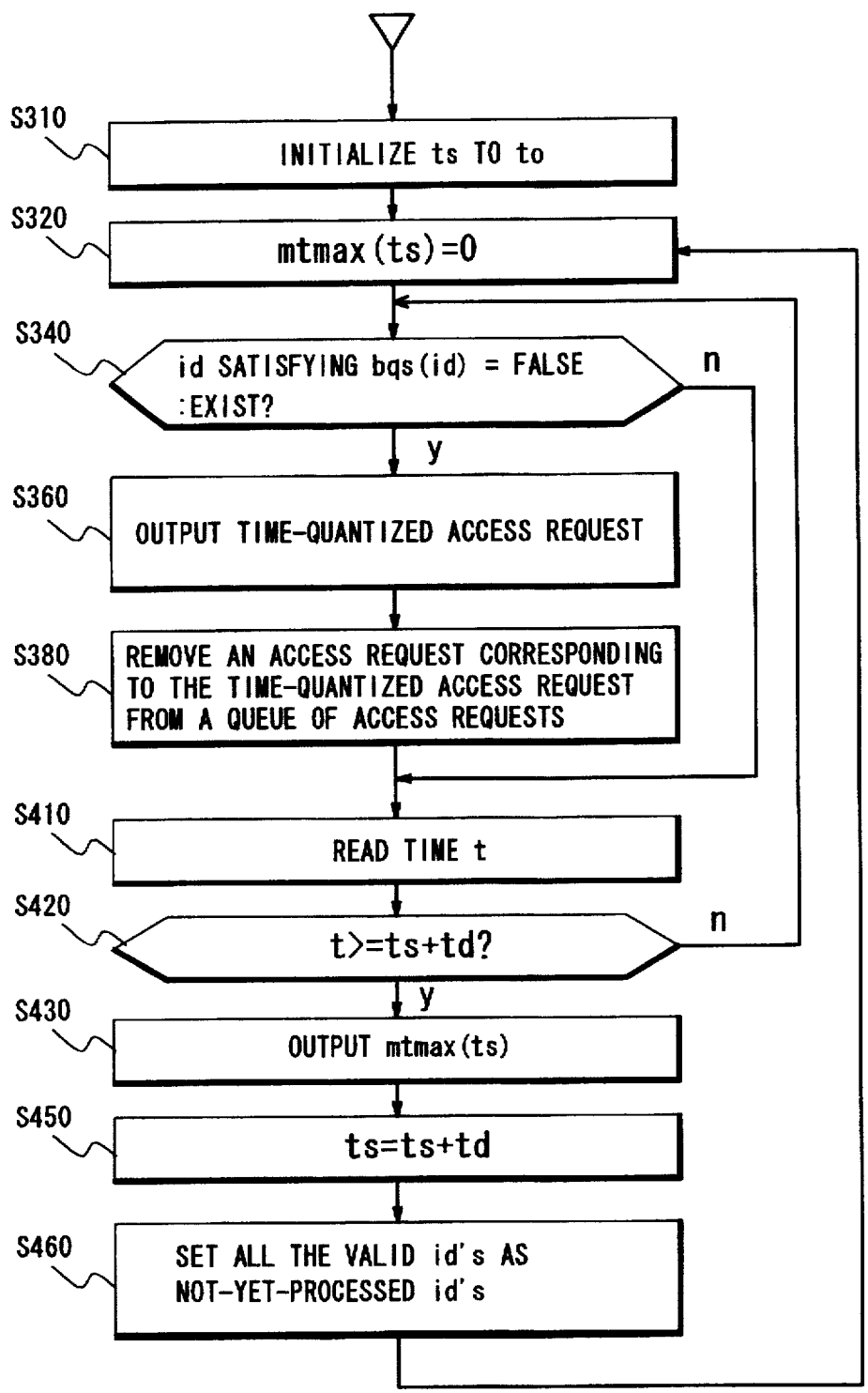
FIG. 19 is a flow chart illustrating the operation of time region quantizing section of the server apparatus according to the first embodiment of the present invention.

Using the symbols and terms defined as described above, the time region quantizing section 3 according to an embodiment will be described below. FIG. 19 is a flow chart of the first embodiment of the time region quantizing section 3. Referring to FIG. 19, a sampling time ts is first initialized to T0 at a step S310 and the number of post-time-region-quantization access requests mtmax(ts) is also reset to "0" at a step S320. Next, the identifier id satisfying bqs(id)= FALSE is searched for at a step S340. If the identifier is present, a post-time-region-quantization access request is produced based on the post-data-region-quantization access request qs(id, 1) corresponding to the searched identifier id at a step S360. The post-time-region-quantization access request is outputted to the queue 4-1 of the access request reducing section 4 as a post-quantization access request. Then, the processed post-data-region-quantization access request is removed from a queue 3-1 of post-data-region-quantization access requests at a step S380. Thereafter, a time t is read from the timer circuit 130 at a step S410. If t<ts+td, then the step S340 and subsequent steps are repeated again at a step S420. If t≧ts+td, then mtmax(ts) is outputted at a step S430 such that ts+td is set to the time ts at a step S450 and FALSE is set to bqs(id) for all the valid identifiers id's at a step S460.

Figure 20:
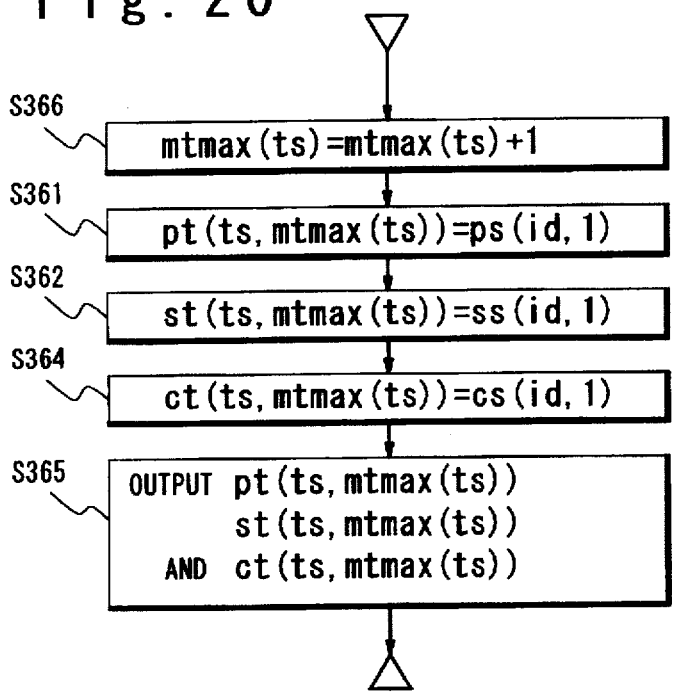
FIG. 20 is a flow chart showing the detail of step S360 of the flow chart shown in FIG. 19 in the time region quantizing section.

FIG. 20 is a flow chart of the detail of step S360 of FIG. 19. The step S360 of FIG. 20 corresponds to the first embodiment and second modification of the data region quantizing section 2. Referring to FIG. 20, the number of post-time-quantization access requests mtmax(ts) is incremented by "1" at a step S366. Subsequently, at a step S361, the head position ps(id, 1) of the first post-data-region-quantization access requests corresponding to a pre-quantization access request having an identifier id is set to the head position pt(ts, mtmax(ts)) which is quantized within the sampling time TQ(ts). Also, the block length ss(id, 1) of the first post-data-region-quantization access request is set to the block length st(ts, mtmax(ts)) at a step S362. Further, the identifier cs(id, 1) of a terminal equipment associated with the first post-data-region-quantization access request is set to the identifier ct(ts, mtmax(ts)) at a step S364. Then, the head position pt(ts, mtmax(ts)), block length st(ts, mtmax(ts)) and identifier ct(ts, mtmax(ts)) are supplied to a queue 4-1 of the access request reducing section 4 at a step S365. The order of the steps 361, 362 and 364 may be changed.

At the step S360 corresponding to the first modification of the data region quantizing section 2, the identifier is(id, 1) of a group of data quantization units associated with the first post-data-region-quantization access requests is set to the post-data-region-quantization access request identifier it(ts, mtmax(ts)) of a group of data region quantization units accessed by the mtmax(ts)-th post-time-quantization access request which is quantized at the sampling time TQ(ts) at one step from the step S366 to the step S365 and supplied to the access request reducing section 4 in addition to the head position pt(ts, mtmax(ts)), block length st(ts, mtmax(ts)) and identifier ct(ts, mtmax(ts)).

Figure 21:
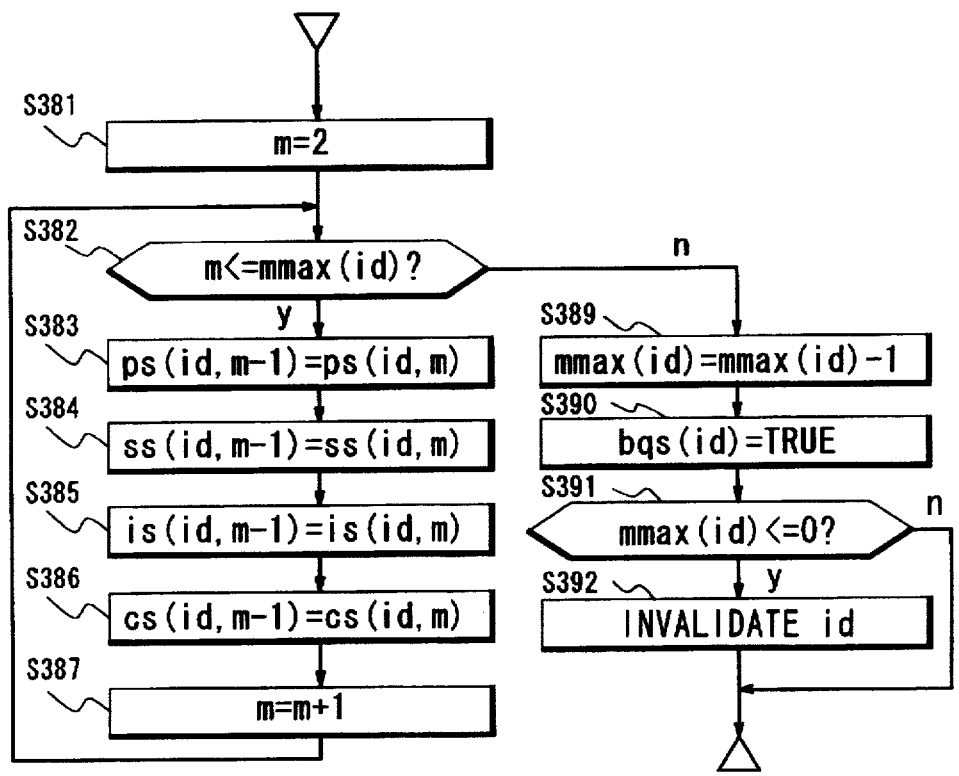
FIG. 21 is a flow chart showing the detail of step S380 of the flow chart shown in FIG. 19 in the time region quantizing section.

FIG. 21 is a flow chart of the detail of step S380 of FIG. 19. Referring to FIG. 21, "2" is first set to m at a step S381 and m and mmax(id) are compared with each other in magnitude at a step S382. If m<mmax(id), then the steps S383, S384, S385, S386 and S387 are executed and then the step S382 is executed again. On the other hand, if m≧mmax (id), a step S389 is executed. The head position ps(id, m) is set to ps(id, m−1) at a step S383, the block length ss(id, m) is set to ss(id, m−1) at a step S384, is(id,m) is set to is(id, m−1) in step S385, is (id,m) is set to is (id, m−1) in step S385, and the identifier cs(id, m) is set to cs(id, m−1) at a step 386. That is, the processed access request is removed from the queue 3-1 by reducing the value of m by "1". The order of the steps S383, 384, 385 and 386 may be changed. At a step S387 the value of m is incremented by "1". On the other hand, after mmax(id) is decremented by "1" at a step S389, the value TRUE is set to the flag bqs(id) at a step S390 and then it is determined at a step S391 whether the mmax(id) is positive or negative. If mmax(id)≧0, the identifier id is invalidated to make it impossible to refer to QSM(id) thereafter. Invalidation of QSM(id) means that all the elements of QSM(id) are already outputted to the access request reducing section 4. Accordingly, a storage area in which QSM(id) are stored can be released.

(4) ACCESS REQUEST REDUCING SECTION

The access request reducing section 4 will be described with reference to the accompanying drawings. Prior to the description, the symbols are defined.

First, a flag indicative of whether the time region quantization for a sampling time TQ(ts) is completed is used and referred to as a time region quantization end flag and represented by mtflg(ts).

In order to individually distinguish collective access requests obtained from the post-quantization access requests through the calculation or processing by the access request reducing section 4 and outputted to the access section 5, a unique identifier ida is assigned to each of the post-quantization access requests. This identifier ida is referred to as a collective access request identifier. As this identifier a general numeric value may be used. Alternatively, a storage area in a memory 120 in which a parameter associated with the collective access request is stored or the address of the storage area may be used or an index of an array of variable area which is prepared on the memory may be used. Here, the identifier assigned to the m-th post-quantization access request outputted from the time region quantizing section 3 within TQ(ts) is represented by ida(ts, mr). The number of terminal equipments 200 corresponding to the post-quantization access request identified by the identifier ida is represented by mq(ida). In the access request reducing section 4, one access request, i.e., a collective access request is generated or produced from the post-quantization access requests having the same access request data region and time region which requests corresponds to the pre-quantization access requests issued from a plurality of terminal equipments 200. For this reason, mq(ida) has the possibility that mq(ida) becomes greater than "1".

With the post-quantization access request obtained by the time region quantization, the following symbols are defined. That is, in a case where the data region quantizing section 2 of the first embodiment or second modification is employed, a combination of the head position pt(ts, mt) and block length st(ts, mt) of the mt-th post-quantization access request for TQ(ts), and the identifier ct(ts, mt) of a terminal equipment 200 which has issued the pre-quantization access request corresponding to the mt-th post-quantization access request is defined as qt(ts, mt). On the other hand, in a case where the data region quantizing section 2 of the first modification is employed, a combination of the head position pt(ts, mt) and block length st(ts, mt) of the mt-th post-quantization access request within TQ(ts), the identifier ct(ts, mt), and the identifier it(ts, mt) of a group of data quantization units which is accessed by the mt-th post-quantization access request is defined as qt(ts, mt).

A parameter designating an access request after reduction, i.e., a collective access request is defined as follows:

cu(ida, mq(ida)): an identifier of mq(ida)-th one of the terminal equipments which have issued pre-quantization access requests associated with the collective access request designated by ida.

Further, a storage area in which data acquired from the storage apparatus 20 in accordance with the collective access request designated by the identifier ida is stored is referred to as an acquisition data storage area and represented by rg(ida). The access request reducing section 4 will be described below using the above definitions.

Figure 22:
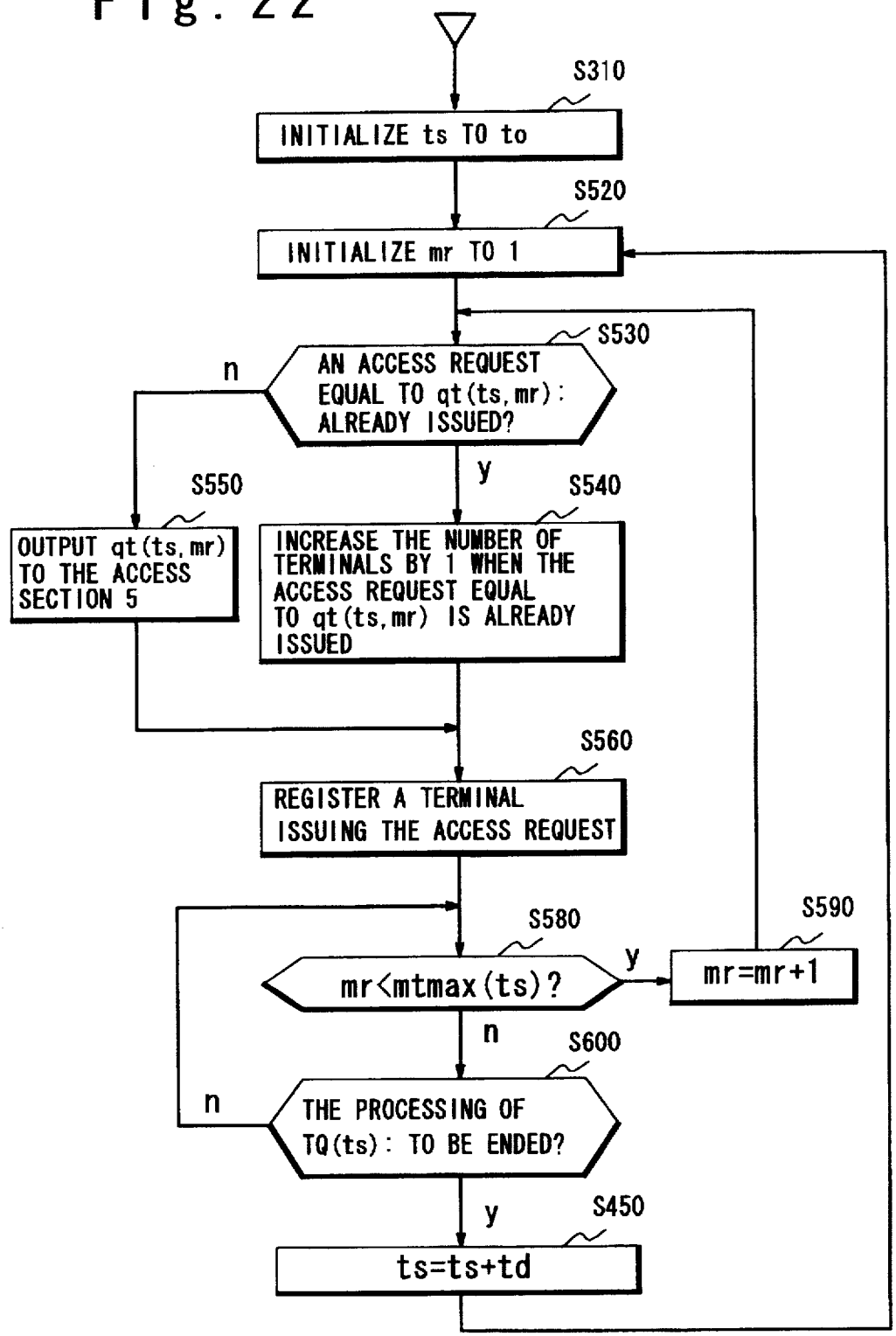
FIG. 22 is a flow chart illustrating the operation of an access request reducing section of the server apparatus according to the first embodiment of the present invention.

FIG. 22 is a flow chart of the access request reducing section 4 in the server apparatus according to the first embodiment of the present invention. Referring to FIG. 22, a time ts is first initialized to T0 at a step S310, and the variable mr is also initialized to "1" at a step S520. Then, it is determined at a step S530 whether a collective access request accessing the data block equal to that accessed by a post-quantization access request qt(ts, mr) is already outputted to the queue 5-1 of the access section 5. If it is determined that the collective access request is already outputted, the number of terminal equipments mq(ida) is incremented by "1" at a step S540. If the collective access request is not yet outputted, the post-quantization access request qt(ts, mr) is outputted as the collective access request to the queue 5-1 of the access section 5 at a step S550. After the step S540 or S550, an identifier of a terminal equipment 200 corresponding to the post-quantization access request qt(ts, mr) is registered in the table 6-1 of the delivery section 6. After the step S560, mr and mtmax(ts) are compared to each other in magnitude at a step S580. If mr<mtmax(ts), then the control goes to a step S590. Otherwise, the control goes to a step S600. At the step S600, it is determined whether the access request reduction on the sampling time period TQ(ts) is to be ended. If it is determined to be ended, the step S450 is executed, whereas, if it is determined not to be ended, a step S580 is executed to update the time period ts to ts+td for the next sampling time. At the step S590, mr is incremented by "1" and then a branch is made to step S530.

Figure 23:
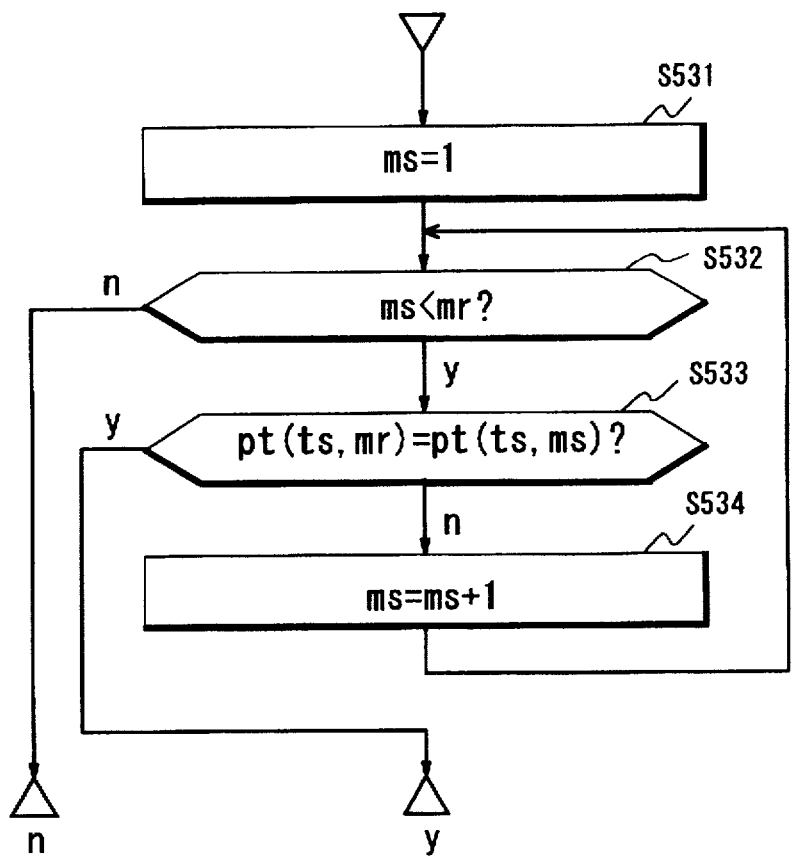
FIG. 23 is a flow chart showing the detail of step S530 of the flow chart shown in FIG. 22 in the access request reducing section.

FIG. 23 is a flow chart of the detail of the step S530 of FIG. 22. Referring to FIG. 23, "1" is first set to a parameter ms at a step S531 and then ms and mr are compared to each other in magnitude at a step S532. If ms<mr, then it is determined that the determination result of the step S530 is N, i.e., negative and the process is ended. If ms≧mr, then a step S533 is executed. At the step S533, it is determined whether pt(ts, mr) is equal to pt(ts, ms). If it is determined to be equal, it is determined that the determination result of the step S530 is Y, i.e., affirmative and the process is ended. If it is determined to be not equal, ms is incremented by "1" at a step S534 and then the step S532 is executed.

Figure 24:
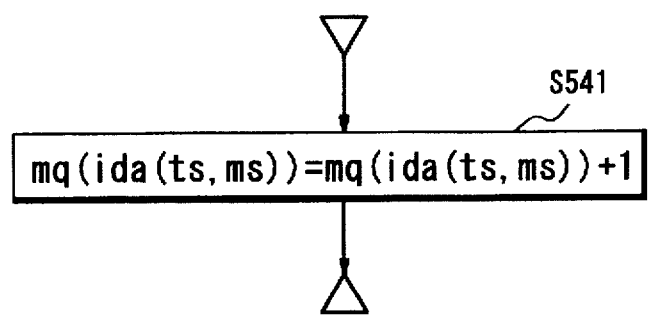
FIG. 24 is a flow chart showing the detail of step S540 of the flow chart shown in FIG. 22 in the access request reducing section.

FIG. 24 is a flow chart of the detail of the step S540 of FIG. 22. Referring to FIG. 24, mq(ida), indicative of the number of terminal equipments 200 which have issued pre-quantization access request corresponding to the collective access request identified by the post-quantization access request identifier ida, is incremented by "1" at a step S541.

Figure 25:
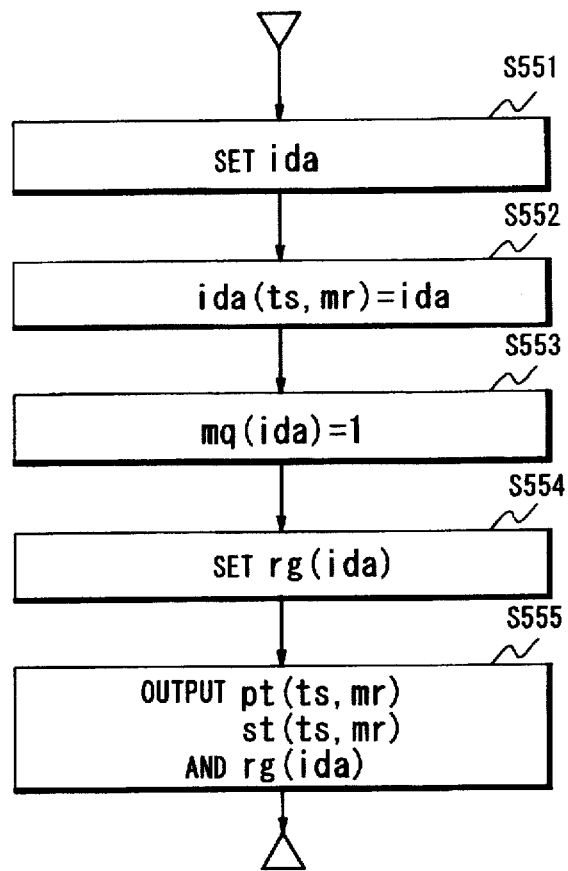
FIG. 25 is a flow chart showing the detail of step S550 of the flow chart shown in FIG. 22 in the access request reducing section.

FIG. 25 is a flow chart of the detail of the step S550 of FIG. 22. Referring to FIG. 22, a post-quantization access request identifier ida which is not yet used is chosen at a step S551. The chosen identifier is set as an identifier of mr-th post-quantization access request issued from the time region quantizing section 3, that is, ida is set to ida(ts, mr) at a step S552. Further, mq(ida), indicative of the number of terminal equipments 200 which have issued the pre-quantization access requests corresponding to the post-quantization access request, is initialized to "1" at a step S553. Furthermore, an acquisition data storage area rg(ida) 6-2 is prepared in the data delivery section 6 (FIG. 2A) at a step S554, and pt(ts, mr), st(ts, mr) and rg(ida) are outputted to the access section 5 such that the storage apparatus 20 is accessed by the access section 5. In order to employ the first modification of the data region quantizing section 2, it(ts, mr) is also outputted to the access section 5 at a step S555.

Figure 26:
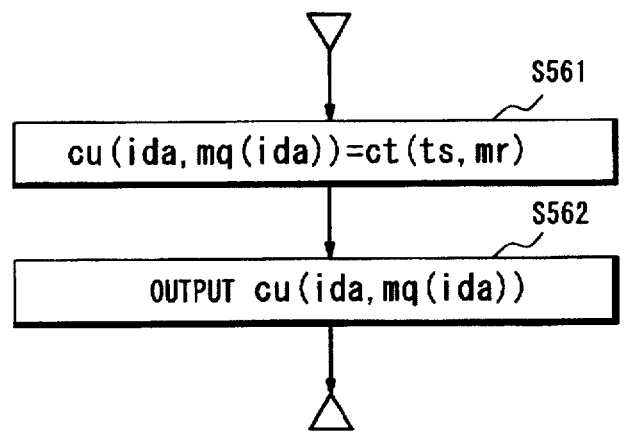
FIG. 26 is a flow chart showing the detail of step S560 of the flow chart shown in FIG. 22 in the access request reducing section.

FIG. 26 is a flow chart of the detail of step S560 of FIG. 22. Referring to FIG. 26, an identifier ct(ts, mr) of a terminal equipment 200 associated with the mr-th post-quantization access request for TQ(ts) is set as an identifier cu(ida, mq(ida)) of the terminal equipment 200 corresponding to the mq(ida)-th post-quantization access request identified by ida at a step S561. The result, i.e., cu(ida, mq(ida)) is outputted to the table 6-1 of the data delivery section 6 at a step S562.

Figure 27:
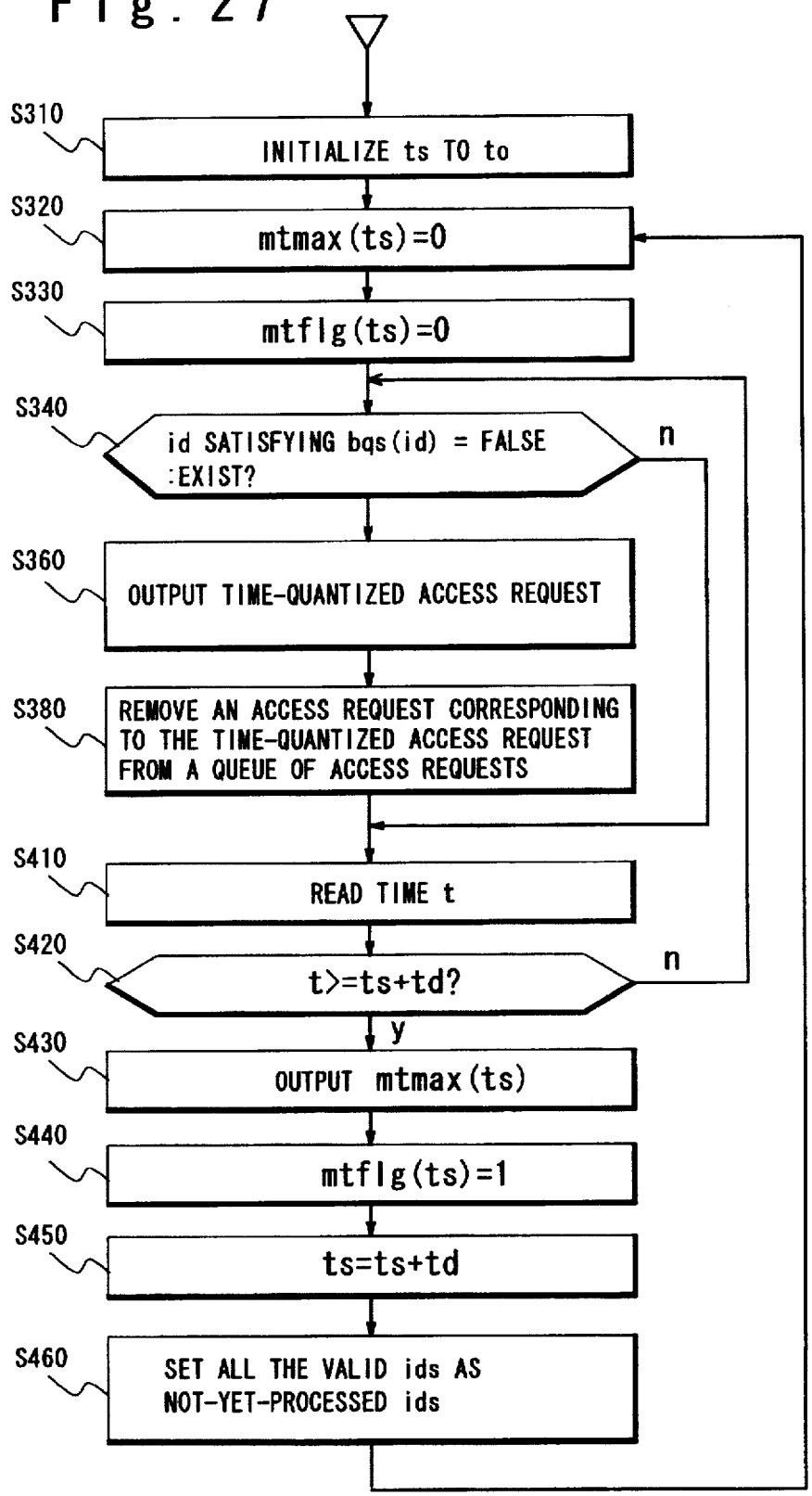
FIG. 27 is a flow chart illustrating the operation of access request reducing section of the server apparatus for achieving the step S600 in FIG. 22.

FIG. 27 is a flow chart illustrating the operation of the time region quantizing section 3 for achieving the step S600 of FIG. 22. Unlike FIG. 19, steps S330 and S440 are inserted after the steps S320 and S430, respectively. At the step S330, mtflg(ts) is reset to "0", and at the step S440, mtflg(ts) is set to "1". That is, when the time region quantization process of the post-data-region-quantization access requests for the sampling time TQ(ts) is executed in time region quantizing section 3, mtflg(ts) is set to "0", and when the process is ended, mtflg(ts) is set to "1". Thus, it is made possible to determine at the step S600 whether the process for TQ(ts) is to be ended.

Figure 28:
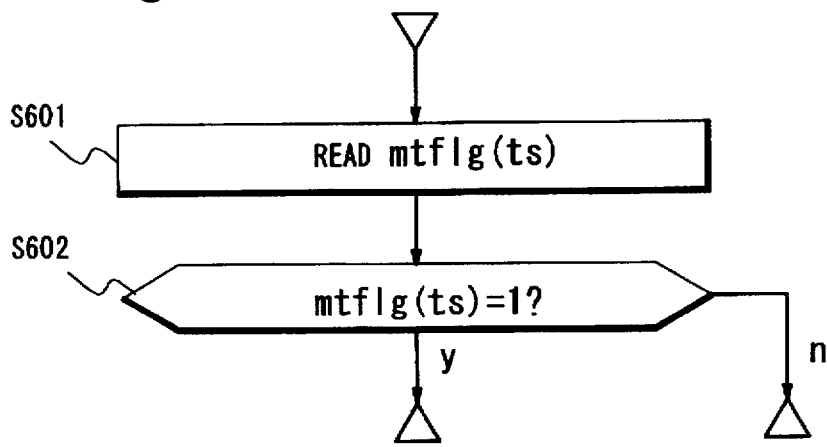
FIG. 28 is a flow chart showing the detail of step S600 of the flow chart shown in FIG. 22.

FIG. 28 is a flow chart illustrating the step S600 of FIG. 22. Referring to FIG. 28, the flag mtflg(ts), set or reset by the time region quantizing section 3, is read at a step S601. If mtflg(ts)="1", it is determined at a step S602 that the determination result of the step S600 is Y, i.e., affirmative. If mgflg(ts)="0", it is determined at the step S602 that the determination result of the step S600 is N, i.e., negative.

(5) ACCESS SECTION

The access section 5 accesses the storage apparatus 20 in accordance with the head position pt(ts, mr) and block length (st(ts, mr) stored in the queue 5-1 to read a data block requested and supplies it to the acquisition data storage area 6-2 of the data delivery section 6 in accordance with the rg(ida). In order to employ the first modification of data region quantizing section 2, the group identifier it(ts, mr) is also used.

(6) DATA DELIVERY SECTION

Figure 29:
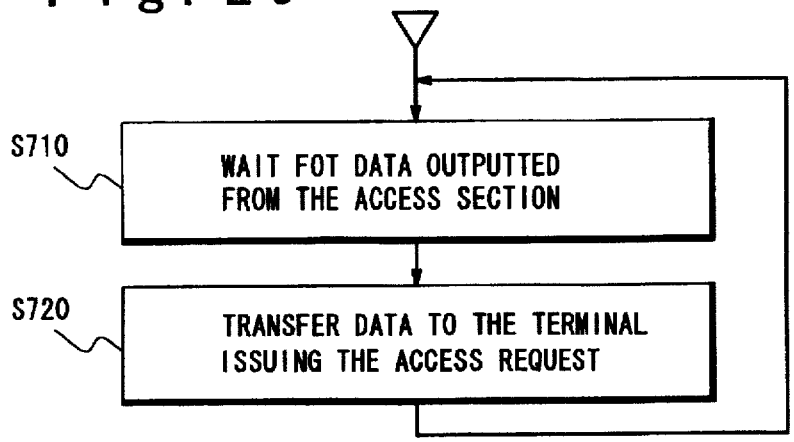
FIG. 29 is a flow chart illustrating the operation of a data delivering section of the server apparatus according to the first embodiment of the present invention.

The data delivery section 6 will be described. FIG. 29 is a flow chart of the operation of data delivery section 6.

Referring to FIG. 29, the data delivery section 6 awaits at a step S710 for data to be outputted from the access section 5. When the data is received, the delivery section 6 delivers the data to the terminal equipments 200 which have issued the pre-quantization access requests corresponding to the data at a step S720 and then the control is returned to the step S710.

Figure 30:
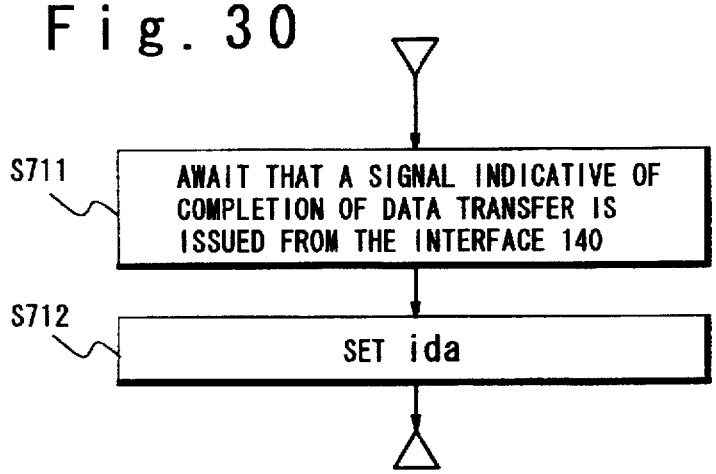
FIG. 30 is a flow chart showing the detail of step S710 of the flow chart shown in FIG. 29 in the data delivering section.

FIG. 30 is a flow chart of the detail of step S710. Referring to FIG. 30, at a step S711, the data delivery section 6 awaits that a signal indicative of the completion of data transfer from the storage apparatus 20 to the delivery section 6 is issued from the access section 5. A post-quantization access request identifier ida corresponding to the data transfer is set at a step S712.

Figure 31:
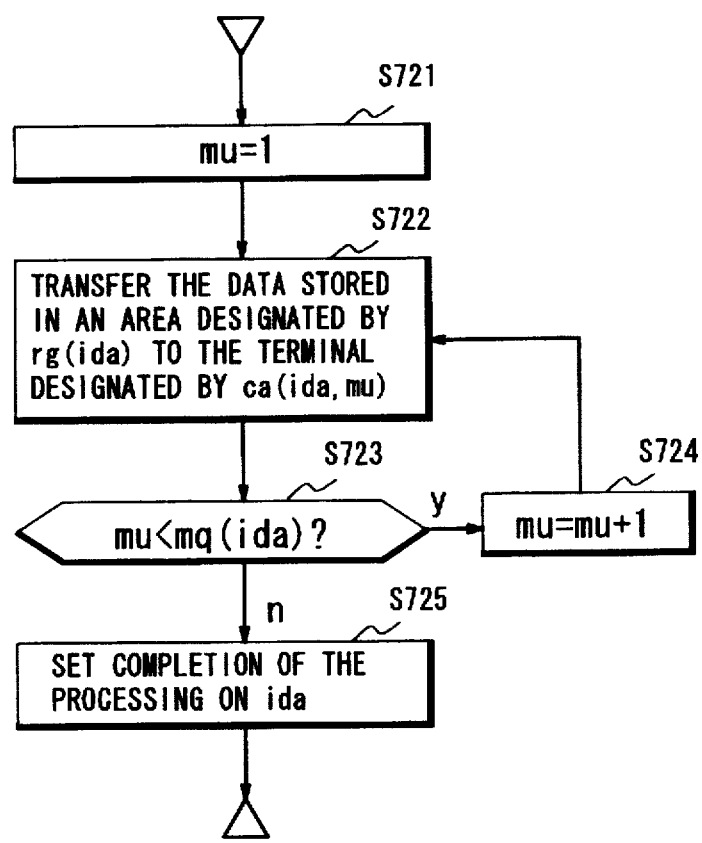
FIG. 31 is a flow chart showing the detail of step S720 of the flow chart shown in FIG. 29 in the data delivering section.

FIG. 31 is a flow chart of the detail of the step S720 of FIG. 29. Referring to FIG. 31, a parameter mu is first initialized to "1" at a step S721, and then at a step S722, the data block stored in the acquisition data storage area rg(ida) 6-2 is transferred to a terminal equipment 200 designated by the mu-th request issuing terminal equipment identifier ca(ida, mu), which is stored in the table 6-1, corresponding to the post-quantization access request identified by ida. Next, mu and the number mq(ida) of request issuing terminal equipments 200 of the post-quantization access request identified by the identifier ida are compared to each other in magnitude at a step S723. If mu<mq(ida), mu is incremented by "1" at a step S724 and then the step S722 is executed again. If mu≧mq(ida), it is determined at a step S725 that the process for the collective access request identifier ida is ended and the control is ended.

In the above-mentioned embodiment, the post-data-region-quantization access requests are sampled for every predetermined time period to perform time region quantization to the post-data-region-quantization access requests. A modification of time region quantizing section 3 will be described in which the time region of the access request is quantized by handling the access requests which are issued or received within a predetermined time period as the access request issued at the same time. Prior to the description of the modification of time region quantizing section 3 in which request issuing time is quantized, the following symbols are defined:

- idv: a post-data-region-quantization access request identifier;
- pv(idv): a head position of the post-data-region-quantization access request identified by idv;
- sv(idv): a block length of the post-data-region-quantization access request identified by idv;
- cv(idv): an identifier of a terminal equipment which has issued a pre-quantization access request corresponding to the post-data-region-quantization access request identified by idv;
- tv(idv): a request issuing time of the pre-quantization access request corresponding to post-data-region-quantization access request identified by idv; and
- qv(idv): post-data-region-quantization access request identified by idv and having a combination of pv(idv), sv(idv), cv(idv) and tv(idv).

Figure 32:
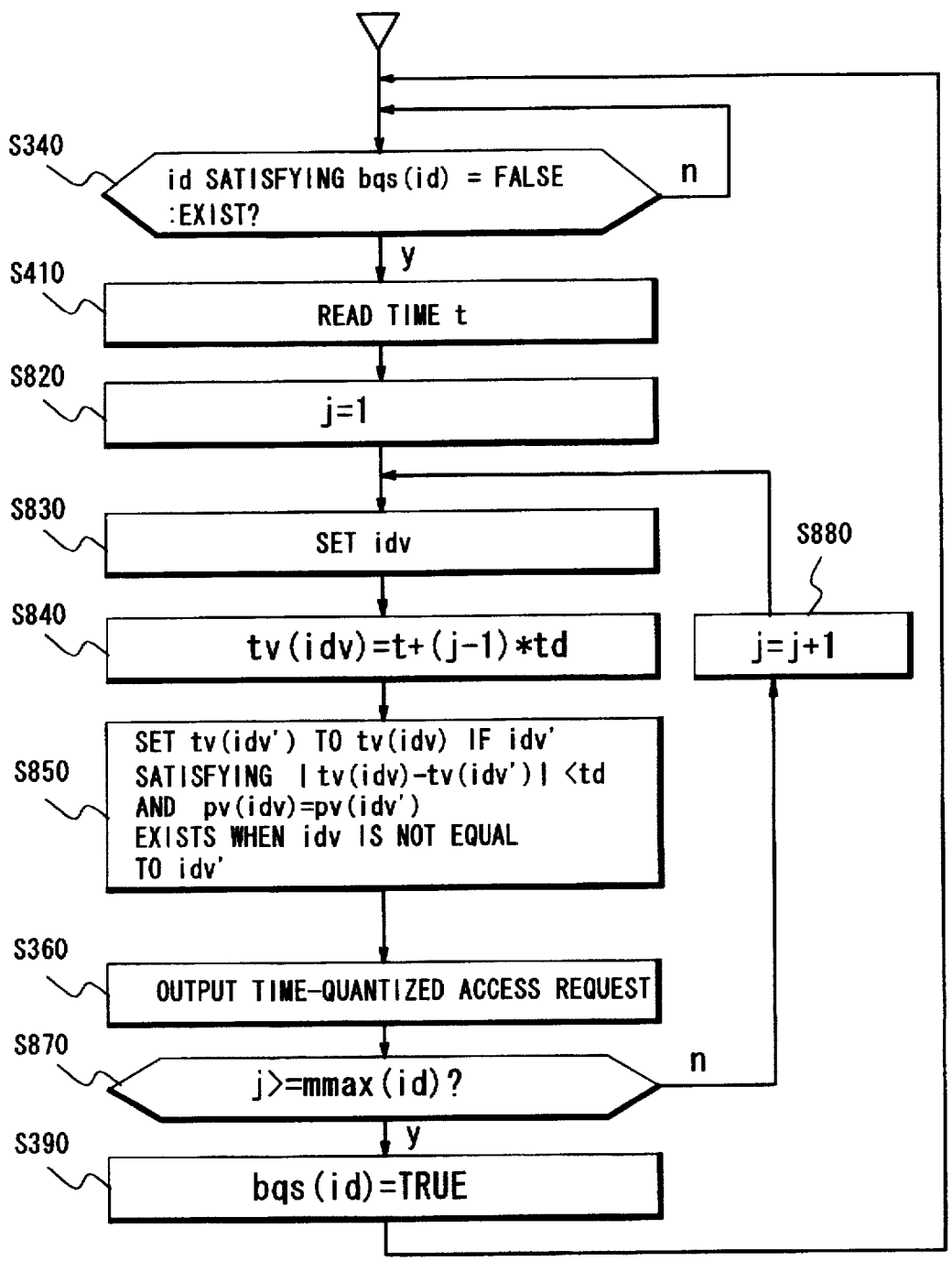
FIG. 32 is a flow chart illustrating the operation of modification of time region quantizing section of the server apparatus according to the first embodiment of the present invention.

FIG. 32 is a flow chart of the operation of modification of time region quantizing section 3. Referring to FIG. 32, it is determined at a step S340 whether id satisfying bqs(id)= FALSE is present. If it is determined to be not present, the step S340 is executed again. If it is determined to be present, a time t is read by use of the timer circuit 130 at a step S410, and then j is initialized to "1" at a step S820. Next, an identifier not yet used is set to idv at a step S830 and then a sum of the time t and (j−1)*td is set to tv(idv) at a step S840. The symbol "*" means multiplication. A post-data-region-quantization access request identifier idv' which is different from idv, satisfying that an absolute value of the difference between tv(idv) and tv(idv') is smaller than td and that pv(idv) is equal to pv(idv') is searched for. If it is searched, tv(idv') is set to tv(idv) at a step S850. In this manner, the time region quantization is performed at the step S850. The post-time-region-quantization access requests obtained based on the result of the step S850 are supplied to the access request reducing section 4 at a step S360 and then j and mmax(id) are compared to each other in magnitude at a step S870. If j<mmax(id), j is incremented by "1" at a step S880 and then the step S830 and the subsequent steps are executed again. If j≧mmax(id), a TRUE value is set to bqs(id) at a step S390 and then the control is returned to the step S340.

Figure 33:
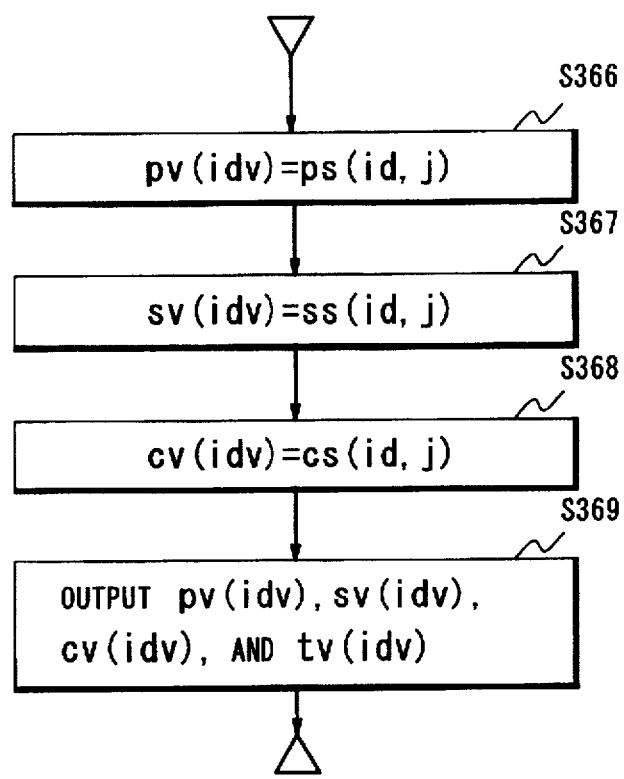
FIG. 33 is a flow chart showing the detail of step S360 of the flow chart shown in FIG. 32 in the modification of time region quantizing section.

FIG. 33 is a flow chart of the detail of step S360 of FIG. 32. Referring to FIG. 33, ps(id, j), ss(id, j) and cs(id, j) are set to pv(idv), sv(idv), and cv(idv) at steps S366, S367, and S368, respectively. After the setting, pv(idv), sv(idv), cv(idv) and tv(idv) are outputted to the access request reducing section 4 at a step S369.

Figure 34:
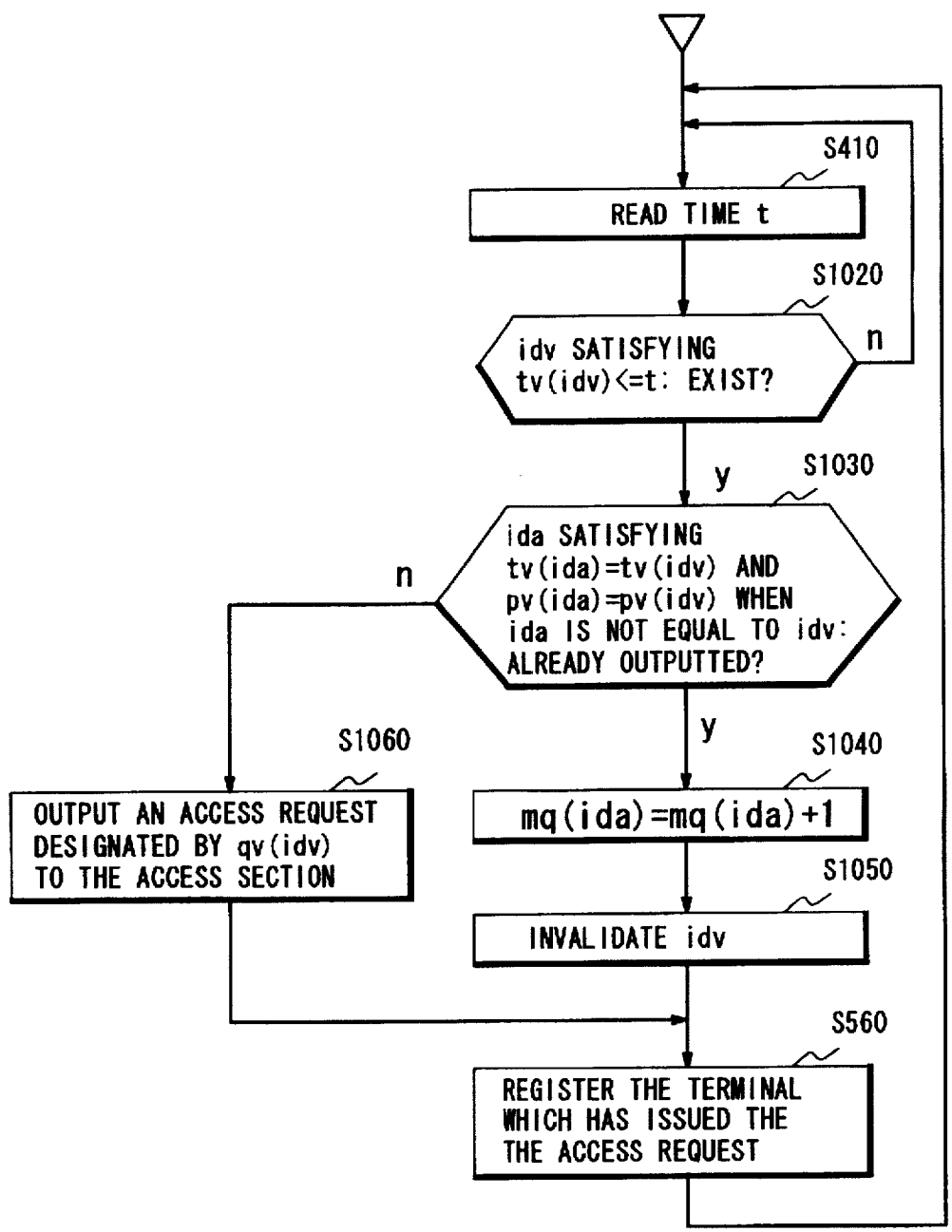
FIG. 34 is a flow chart illustrating the operation of access request reducing section corresponding to the modification of time region quantizing section of the server apparatus according to the first embodiment of the present invention.

FIG. 34 is a flow chart of the operation of access request reducing section 4 corresponding to the modification of time region quantizing section 3. Referring to FIG. 34, a time t is first read from the timer circuit 130 at a step S410, and then it is determined at a step S1020 whether idv satisfying that tv(idv) is smaller than t is present. If it is determined not to be present, the step S410 is executed again. If it is determined to be present, the control goes to a step S1030. Whether the collective access request identified by an identifier ida different from idv is already outputted to the access section 5 is determined which request satisfies that tv(ida)=tv(idv) and that pv(ida)=pv(idv). If it is determined to be already outputted, a step S1040 is executed, and if it is determined to be not yet outputted, a step S1060 is executed. At the step S1040, mq(ida) is incremented by "1" and then idv is invalidated at a step S1050 for steps following the step S1040. At the step S1060, qv(idv) is outputted to the access section 5 such that a data block is read out. After the step S1050 or S1060, the identifier of a terminal equipment 200 which has issued the access request is registered in the data deliver section 6 at a step S560 and then the step S410 is executed again.

Figure 35:
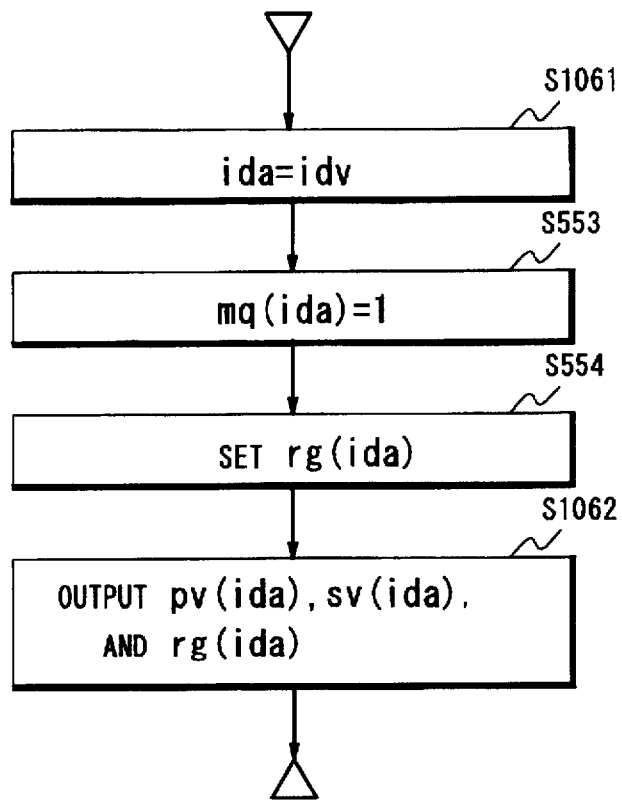
FIG. 35 is a flow chart showing the detail of step S1060 of the flow chart shown in FIG. 34 in the modification of access request reducing section of FIG. 34.

FIG. 35 is a flow chart of the detail of step S1060 of FIG. 34. Referring to FIG. 35, idv is set to ida at a step S1061 and mq(ida) is initialized to "1" at a step S553. Subsequently, rg(ida) is set at a step S554 and then pv(ida), sv(ida), rg(ida) are outputted to the access section 5 at a step S1062.

Figure 36:
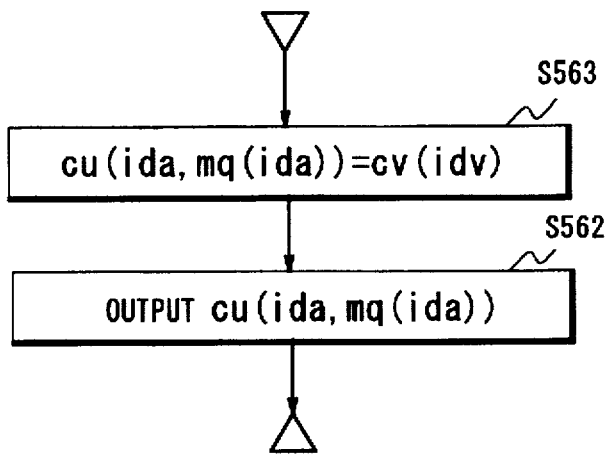
FIG. 36 is a flow chart showing the detail of step S560 of the flow chart shown in FIG. 34 in the modification of access request reducing section of FIG. 34.

FIG. 36 is a flow chart of the detail of step S560 of FIG. 34. Referring to FIG. 36, cv(idv) is set to cu(ida, mq(ida)) at a step S563 and cu(ida, mq(ida)) is outputted to the table 6-1 of the data delivery section 6 at a step S562.

Next, the data serving system according to the second embodiment of the present invention will be described with reference to FIG. 44. In the first embodiment of the data serving system, the time region quantization is performed after the data region quantization. On the second embodiment, the data region quantization is performed after the time region quantization. The same reference numerals and symbols as in FIG. 2A have the same functions and meanings. Therefore, the detailed description is omitted.

Prior to the description of the second embodiment, the following symbols are defined:

- mwmax(ts): the total number of post-data-region-quantization access requests for TQ(ts);
- pw(ts, mw): the head position designated by the mw-th post-data-region-quantization access request for TQ(ts);

sw(ts, mw): the block length designated by the mw-th post-data-region-quantization access request for TQ(ts); and cw(ts, mw): the identifier of a terminal equipment associated with the mw-th post-data-region-quantization access request for TQ(ts).

Figure 37:
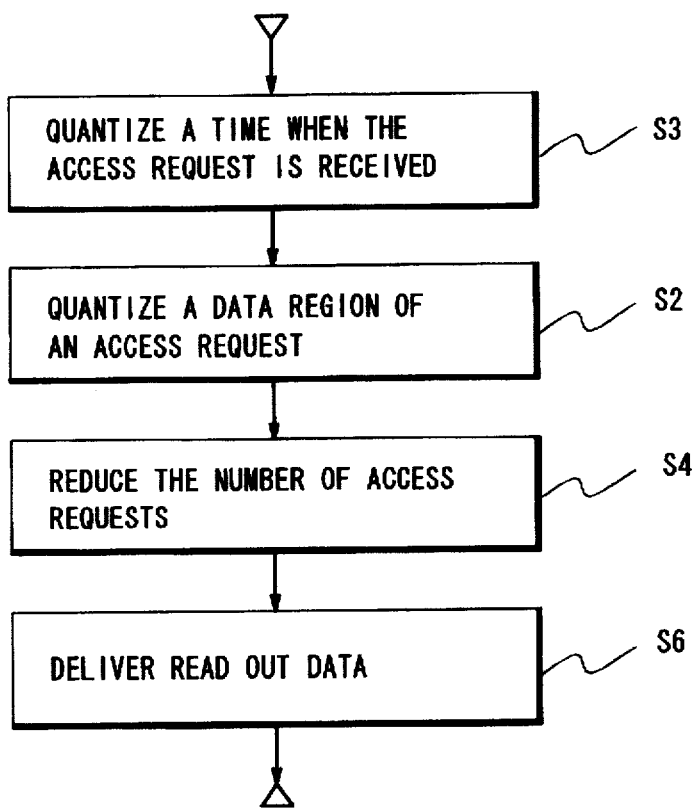
FIG. 37 is a flow chart illustrating the operation of the data serving apparatus according to the second embodiment of the present invention.

FIG. 37 is a flow chart of the operation of the server apparatus according to the second embodiment. Referring to FIG. 37, the data region quantizing step and the time region quantizing step are exchanged, compared to FIG. 2B. However, the same advantage can be obtained.

Figure 38:
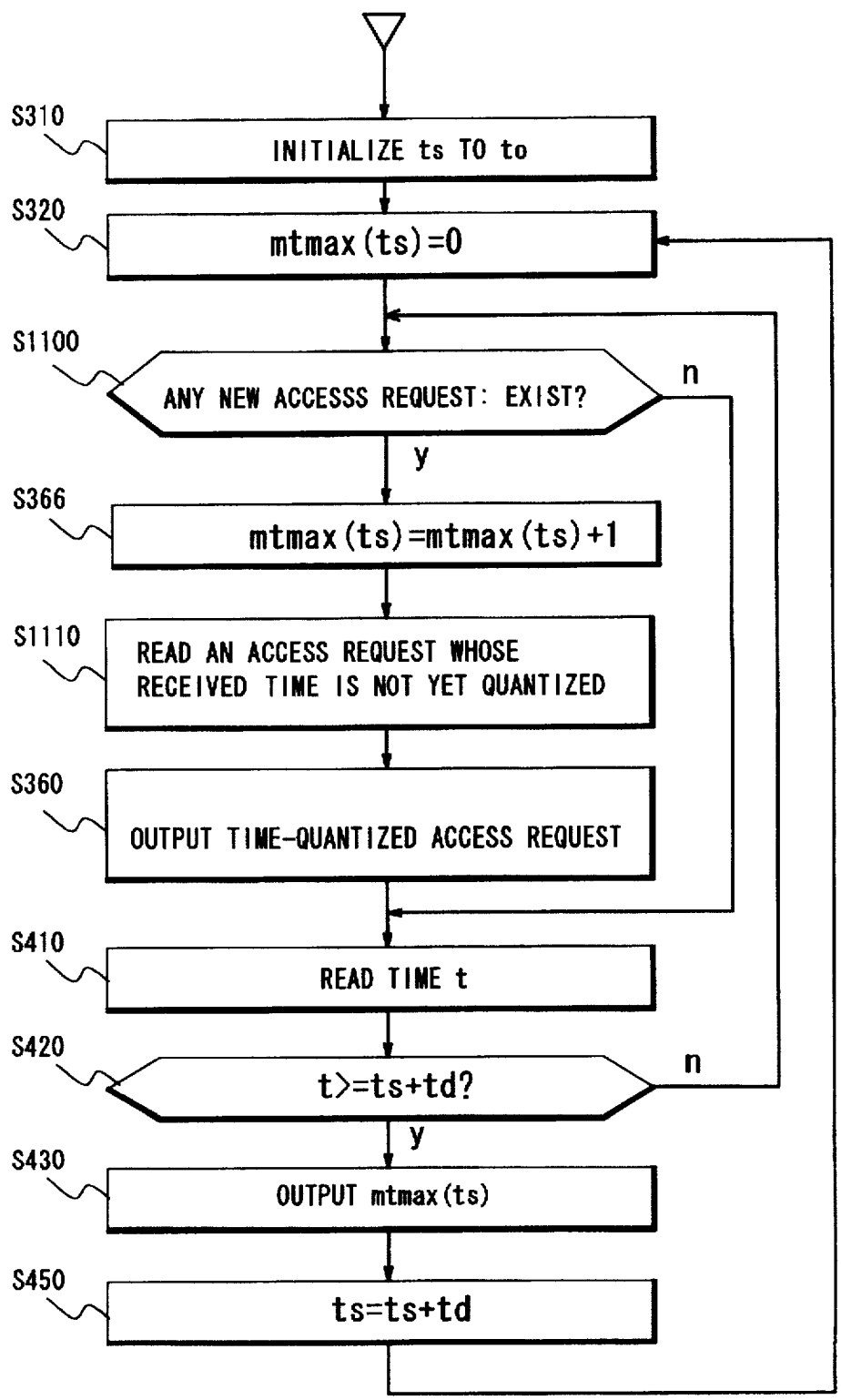
FIG. 38 is a flow chart illustrating the operation of time region quantizing section in the data serving apparatus according to the second embodiment.
Figure 44:
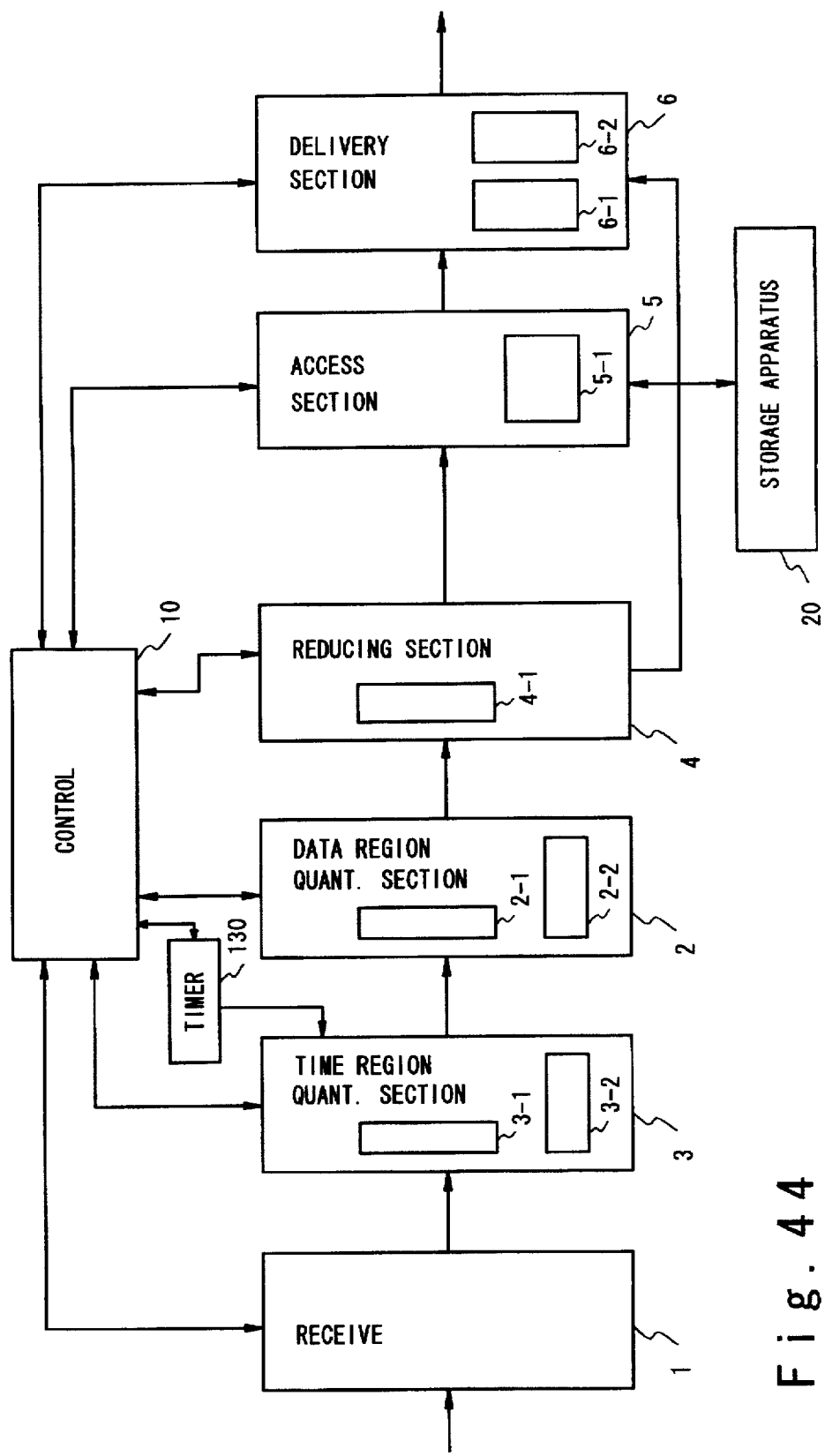
FIG. 44 is a functional block diagram of the data serving apparatus according to the second embodiment of the present invention.

FIG. 38 is a flow chart illustrating the operation of time region quantizing section 3 shown in FIG. 44. Referring to FIG. 38, a time ts is first initialized to to at a step S310 and "0" is set to mtmax(ts) at a step S320. Then, it is determined at a step S1100 whether a new access request, i.e., a pre-quantization access request is received in the queue 3-1 by the receiving section 1. If the new access request is received, a step S366 is executed, whereas, if not received, a step S410 is executed. At the step S366, mtmax(ts) is incremented by "1" and then the pre-quantization access request is read at a step 1110 to perform the time region quantization to it. Subsequently, a post-time-region-quantization access request obtained by the above quantization is outputted to the queue 2-1 of the data region quantizing section 2 at a step S360. At a step S410, a time t is read from the timer circuit 130, and ts and ts+td are compared to each other in magnitude at a step S420. If ts<ts+td, the step S1100 is executed again. If not, a step S430 is executed. At the step S430, mtmax(ts) is outputted to the queue 2-1 of the data region quantizing section 2. Thereafter, td is added to ts and the control returns to the step S320.

Figure 39:
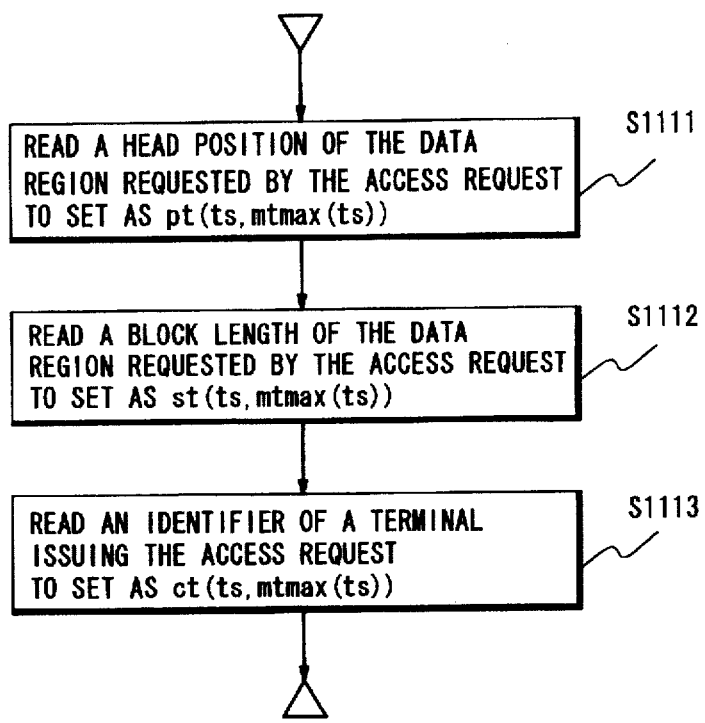
FIG. 39 is a flow chart illustrating the detail of step S1110 of FIG. 38.

FIG. 39 is a flow chart illustrating the detail of the step S1110 of FIG. 38. Referring to FIG. 39, the head position designated by the pre-quantization access request is read from the queue 3-1 to set to pt(ts, mtmax(ts)) at a step S1111. Subsequently, the block length is read to set to st(ts, mtmax (ts)) at a step S1112. Next, an identifier of a terminal equipment 200 which has issued the pre-quantization access request is read to set to ct(ts, mtmax(ts)) at a step S1113.

Figure 40:
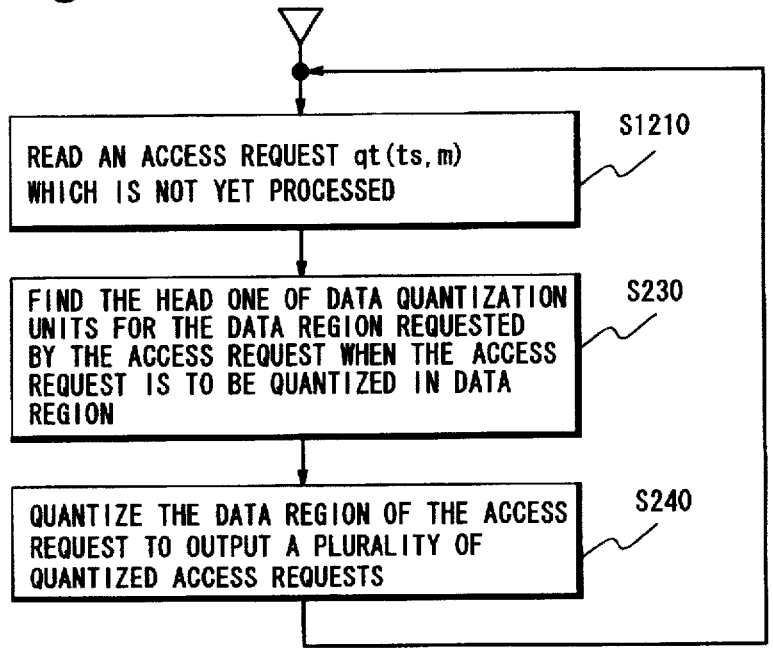
FIG. 40 is a flow chart illustrating the operation of data region quantizing section in the data serving apparatus according to the second embodiment.

FIG. 40 is a flow chart illustrating the operation of the data region quantizing section 2 of FIG. 37. Referring to FIG. 40, a post-time-region-quantization access request qt(ts, m) not yet processed is read from the queue 2-1 at a step S1210 and the head position of a data region quantization unit designated by a post-data-region-quantization aces request is searched for at a step S230. Also, the block length of data region quantization unit or data block is determined, and the data region is quantized to output a plurality of post-quantization access requests corresponding to the read post-time-region-quantization access request to the queue 4-1 of the access request reducing section at a step S240.

Figure 41:
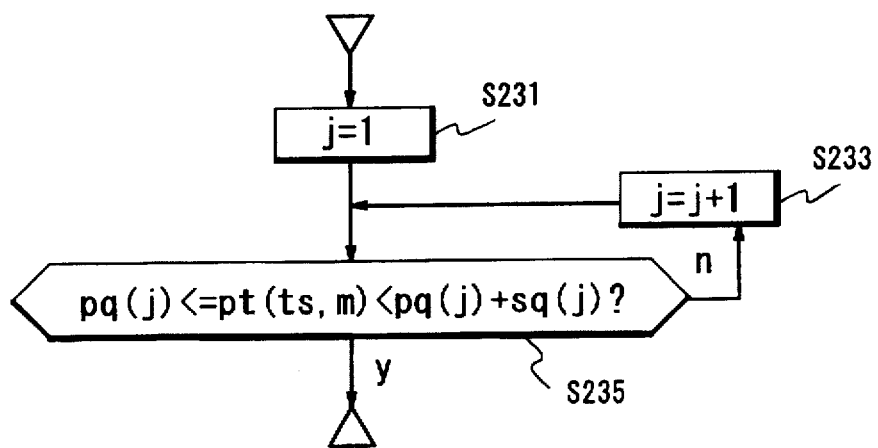
FIG. 41 is a flow chart illustrating the detail of step S230 of FIG. 40.

FIG. 41 is a flow chart illustrating the detail of step S230 of FIG. 40. Referring to FIG. 41, "1" is set to j at a step S231 and it is determined at a step S234 whether pt(ts, m) exists in a data region quantization unit having the head position pq(j) and the block length sq(j). If so, the process is ended. If not so, j is incremented by "1" at a step S233 and then the step S231 is executed again.

Figure 42:
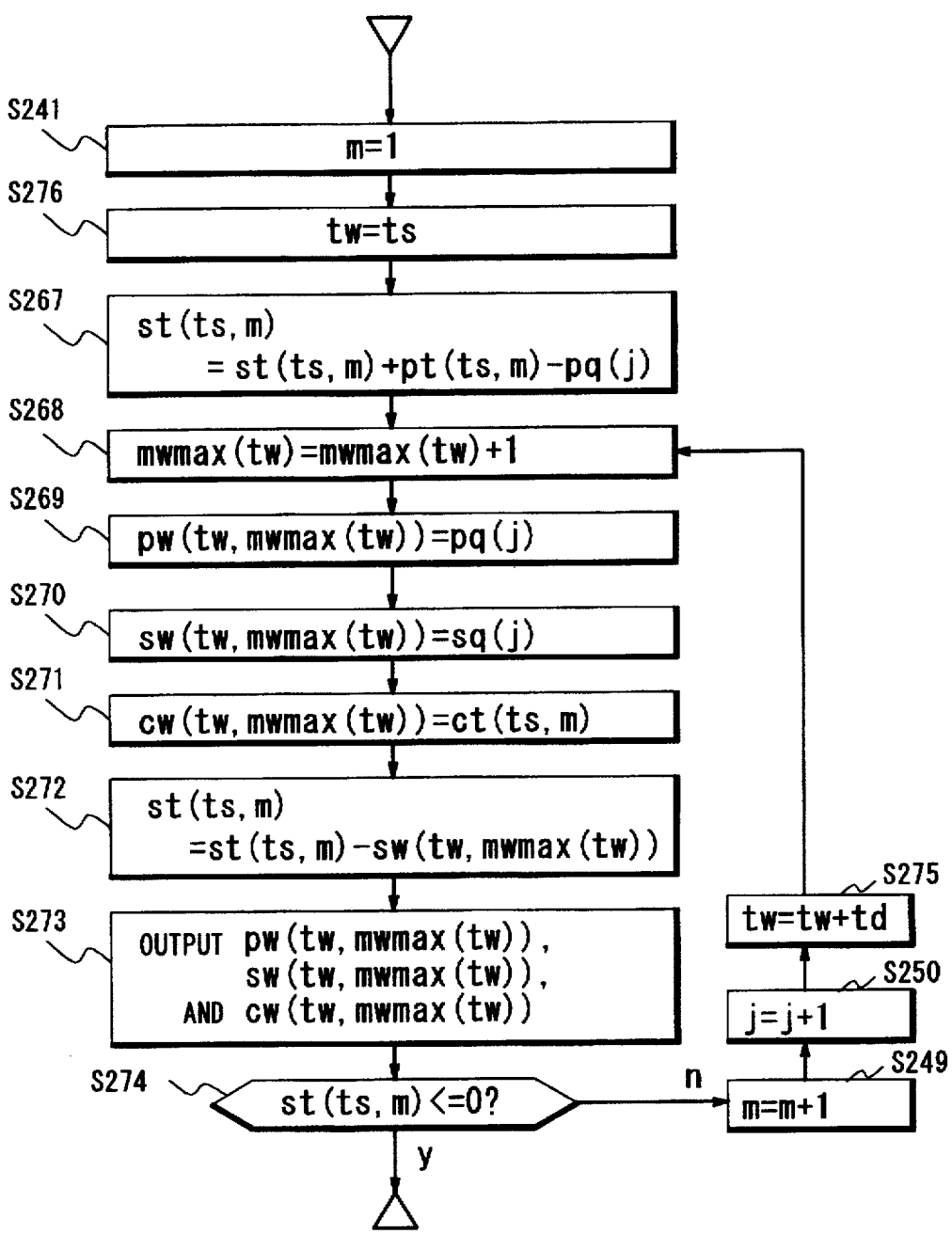
FIG. 42 is a flow chart illustrating the detail of step S240 of FIG. 40.

FIG. 42 is a flow chart of the detail of step S240 of FIG. 40. Referring to FIG. 41, "1" is first set to m at a step S241 and tw is initialized to ts at a step S276. A difference between pt(ts, m) and pq(j) is added to st(ts, m) and the result is set to st(ts, m) at a step S267. Subsequently, mwmax(tw) is incremented by one at a step S268, and pq(j), sq(j) and ct(ts, m) are set to pw(tw, mwmax(tw)), sw(tw, mwmax(tw)) and cw(tw, mwmax(tw)) at steps S269, S270 and S271, respectively. Next, sw(tw, mwmax(tw)) is subtracted from st(ts, m) at a step S272 and pw(tw, mwmax(tw)), sw(tw, mwmax(tw)) and cw(tw, mwmax(tw)) are supplied to the queue 4-1 of the access request reducing section 4 at a step S273. Subsequently, it is determined at a step 274 whether st(ts, m) is positive. If st(ts, m)<0, then the control is ended. If not so, m is incremented by "1" at a step S249 and j is also incremented by "1" at a step S250 and then tw is added with td at a step S275. Thereafter, the step S268 is executed again.

Figure 43:
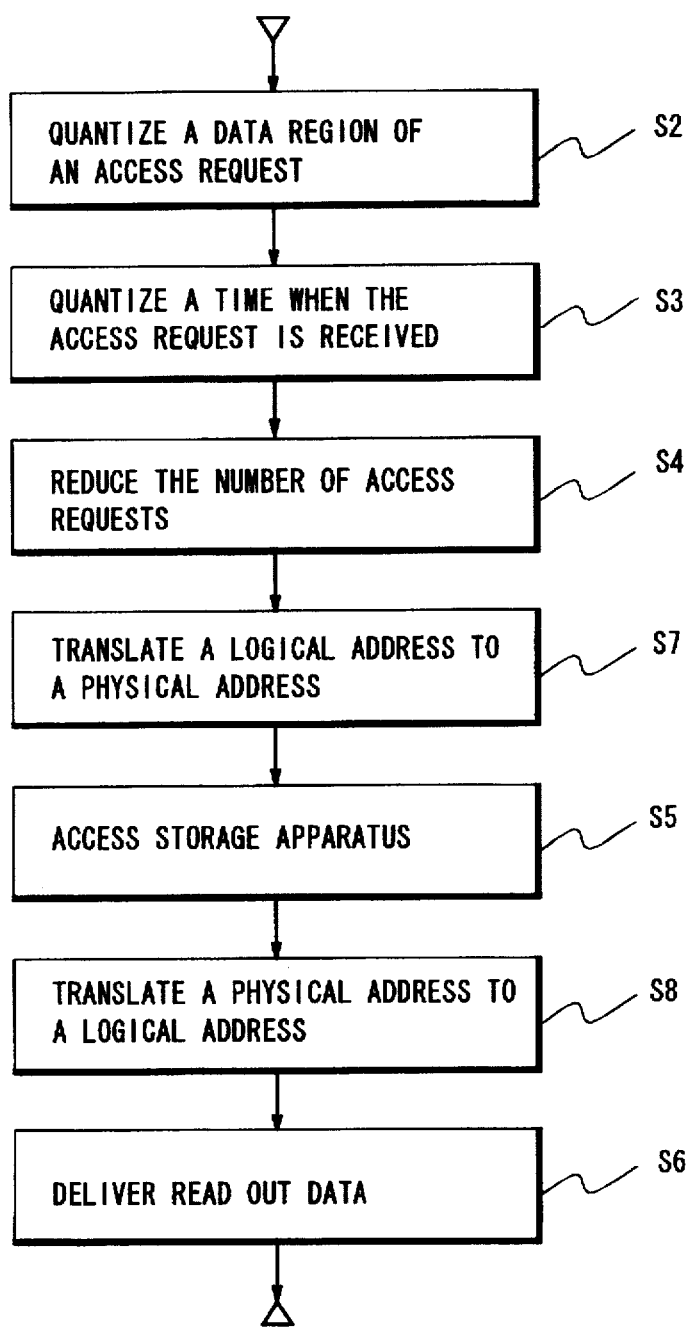
FIG. 43 is a flow chart illustrating the operation of the data serving apparatus according to the third embodiment of the present invention.
Figure 45:
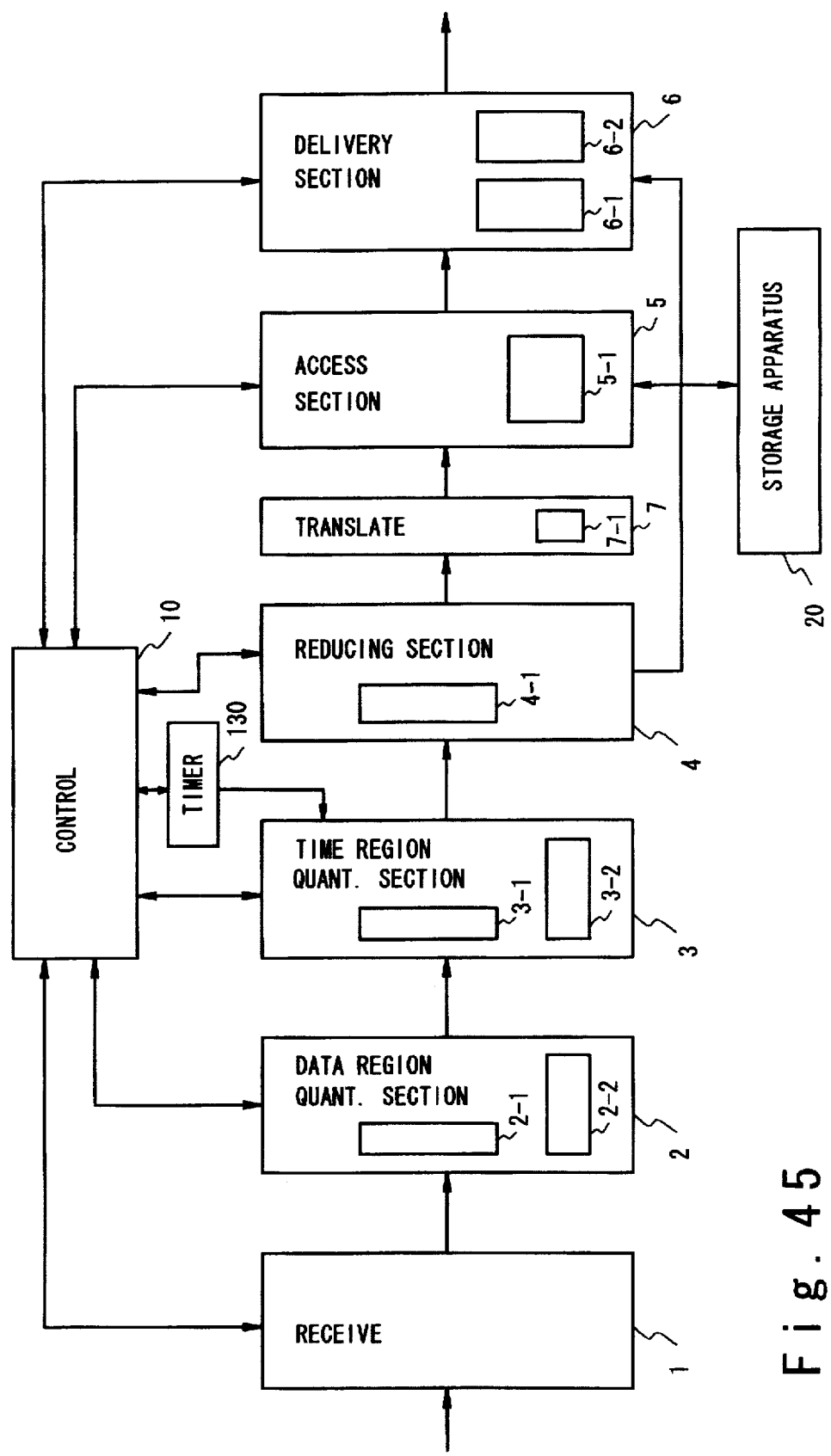
FIG. 45 is a functional block diagram of the data serving apparatus according to the third embodiment of the present invention.

Next, the data serving system according to the third embodiment will be described below. FIG. 45 is a functional block diagram of the server apparatus and FIG. 43 is a flow chart of the third embodiment. In this embodiment, a translating section 7 is provided between the access request reducing section 4 and the access section 5 to translate a logical address into a physical address. That is, the translating section 7 performs the mapping between the logical data arrangement for the access request and the physical data arrangement in the storage apparatus 20 (step S7). The access section 5 reads data from the storage apparatus 20 based on a physical address (step S5) and supplies the read data to the delivery section 6 with a logical address corresponding to the data which is transferred from the translating section 7 (step S7). Thereby, an arbitrary combination would be possible between a method of designating an access request in the data region quantizing section 2, time region quantizing section 3, and access request reducing section 5 and a method of accessing the storage apparatus 20. For instance, data can be distributedly stored in a plurality of storage devices in a striping manner so that the reduction of access time can be achieved.

In conjunction with the third embodiment, a logical address/physical address translating section and a physical address/logical address translating section may be provided between the access request reducing section 4 and the access section 5 and between the access section and the data delivery section 6 for executing the steps S7 and S8, respectively. In this case, the same advantages can be obtained.

Figure 46:
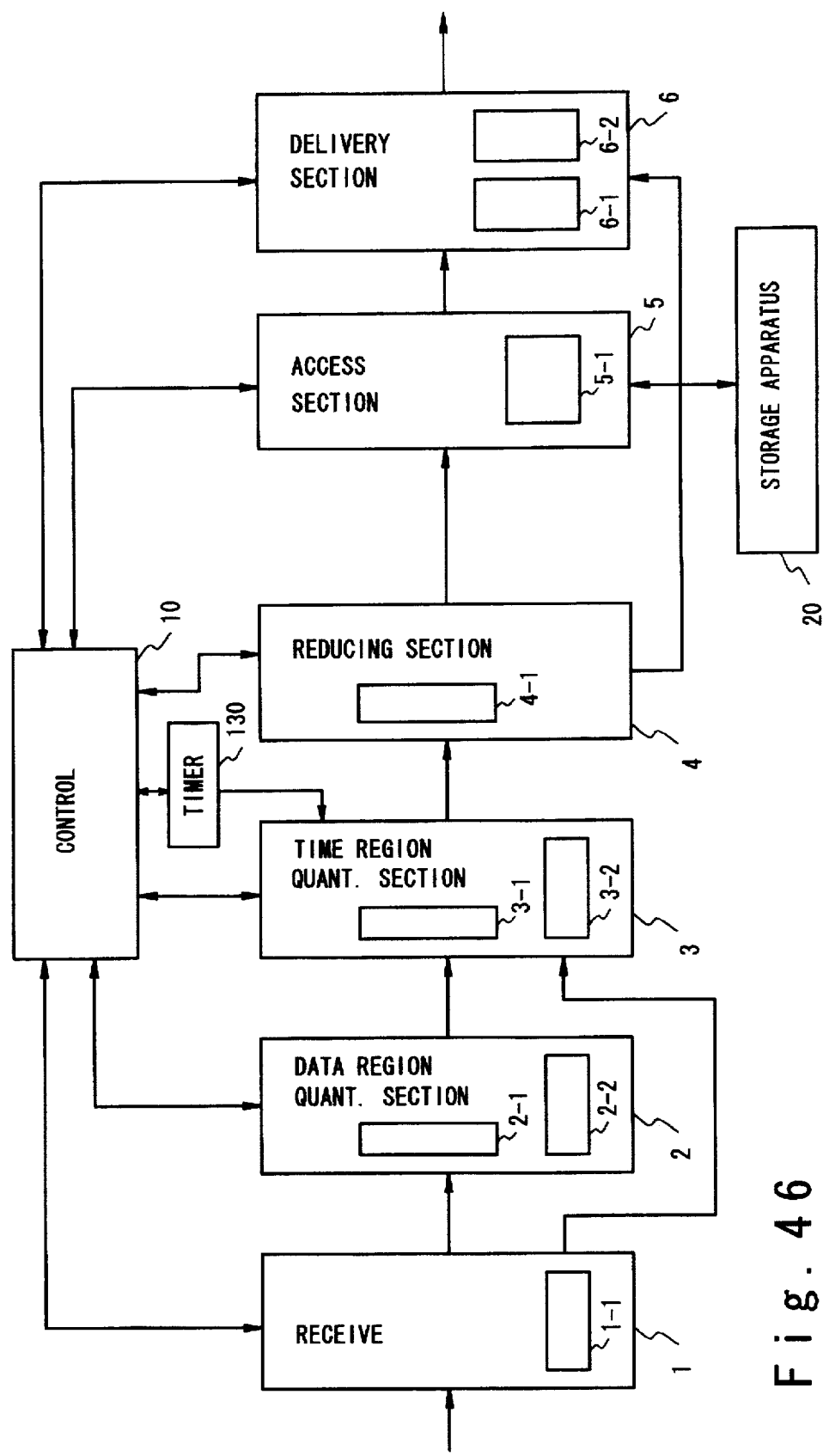
FIG. 46 is a functional block diagram of the data serving apparatus according to the fourth embodiment of the present invention.

Next, the server apparatus according to the fourth embodiment of the present invention will be described below. In the above embodiments, there was described a case where access requests are issued from terminal equipments 200 for random data regions and the data region quantizing section 2 quantizes the access requests. However, in a case where only an access request for predetermined data blocks is issued from a terminal equipment, that is, the data region designated by the access request is quantized in advance, the data region quantizing section 2 can be omitted. For instance, in a video data server apparatus which outputs video data in response to an access request from a terminal equipment 200, a case that the terminal equipment 200 designates only the title of video data corresponds to the above case. When an optical disk device or optomagnetic disk apparatus is employed for the storage apparatus, the access operation is performed in a predetermined data block unit in many cases. Therefore, the access requests are often quantized in advance, so that the data region quantizing section 2 could be omitted. FIG. 46 is a functional block diagram showing the structure of server apparatus according to the fourth embodiment. In this embodiment, the receiving section 1 includes a section 1-1 for determining whether a data region requested by the received access request is quantized in advance. If it is determined to be pre-quantized, the access request is directly supplied to the time region quantizing section 3. If not so, the access request is supplied to the data region quantizing section 2 as described above.

Figure 47:
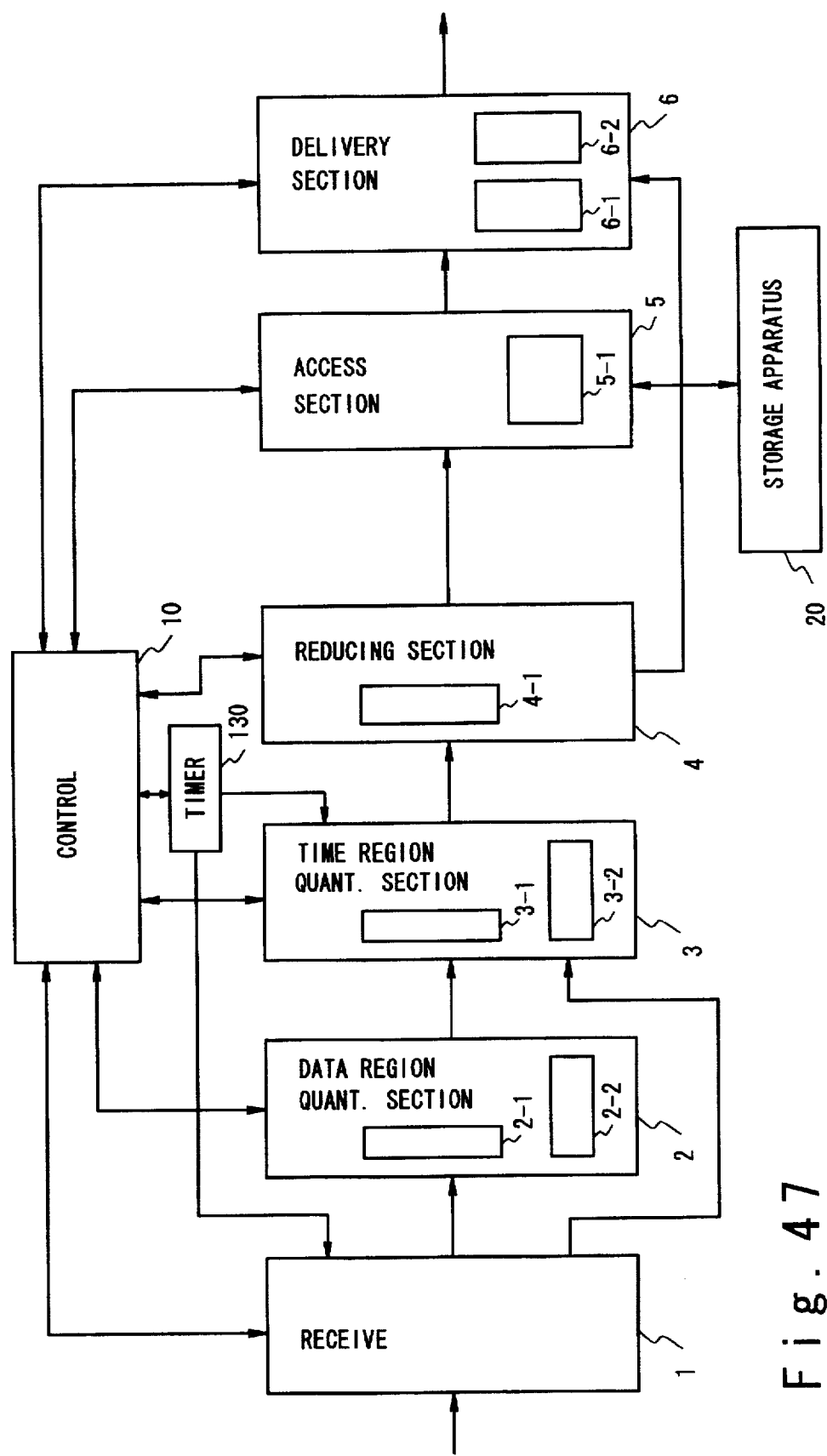
FIG. 47 is a functional block diagram of the data serving apparatus according to the fifth embodiment of the present invention.

Next, the server apparatus according to fifth embodiment of the present invention will be described. FIG. 47 is a functional block diagram showing the structure of server apparatus according to the fifth embodiment. In this embodiment, the receiving section 1 counts the number of received access requests based on a time period informed from the timer circuit 130 and informs it to the control section 10. The control section 10 controls the data and time regions quantizing sections 2 and 3 in accordance with the number of received access requests. That is, the size of data region quantization unit and/or the size of time region quantization unit are adjusted by the control section 10 based on the number of received access requests.

As described above, in the data serving system according to the present invention, the access request issued from a terminal equipment is quantized with respect to a data region and/or time region to generate a plurality of post-quantization access requests, and then a single access request is chosen or generated from the post-quantization access requests for the same quantization unit. Therefore, the number of access requests can be reduced. Thus, the load to each of the storage devices of the storage apparatus can be decreased and a short response time can be achieved for a large amount of access requests.

Further, by adjusting the size of data region quantization unit and/or the size of time region quantization unit, it is possible to design the server apparatus in accordance with the data output capability of the storage apparatus and access frequency from the terminal equipments.

In addition, in a case that the present invention is applied to a video data server system, even if access requests for various data blocks of the video data are issued, the video data can be delivered to more terminal equipments with less hardware of the server apparatus.

What is claimed is:

1. A data delivery server apparatus to which a plurality of terminal equipments are connected, comprising:

storage means for storing a plurality of data, each of which comprises one or more data blocks;

quantizing means for receiving an access request as a pre-quantization access request from each of the plurality of terminal equipments, the pre-quantization access request requesting a data stored in said storage means, and for quantizing said access request in units of at least one of data region quantization units and time region quantization units to produce one or more post-quantization access requests associated with one or more data blocks of said data, wherein at least one of said data region quantization unit and said time region quantization unit is variable in size based on a number of said pre-quantization access requests;

reducing means for producing a collective access request from said post-quantization access requests;

access means for accessing said storage means in accordance with each of said collective access requests to read out the corresponding data block from said storage means; and delivery means for delivering the data block to the plurality of terminal equipments which have issued said pre-quantization access requests corresponding to said each collective access request.

2. A data delivery server apparatus according to claim 1, wherein said quantizing means includes data region quantizing means for quantizing said pre-quantization access request in units of data region quantization units.

3. A data delivery server apparatus according to claim 1, wherein said quantizing means includes time region quantizing means for quantizing said pre-quantization access request in units of time region quantization units.

4. A data delivery server apparatus according to claim 1, wherein said quantizing means includes:

data region quantizing means for quantizing each of said pre-quantization access requests in units of data region quantization units to produce one or more post-data-region-quantization access requests; and time region quantizing means for quantizing each of said post-data-region-quantization access requests in units of time region quantization units to produce said one or more post-quantization access requests.

5. A data delivery server apparatus according to claim 1, wherein said quantizing means includes:

time region quantizing means for quantizing each of said pre-quantization access requests in units of time region quantization units to produce one or more post-time-region-quantization access requests; and data region quantizing means for quantizing each of said post-time-region-quantization access requests in units of data region quantization units to produce said one or more post-quantization access requests.

6. A data delivery server apparatus according to claim 4, wherein said quantizing means further includes receiving means for receiving each of said pre-quantization access requests, for determining whether said each pre-quantization access request needs quantization of the data region, and for by-passing said data region quantizing means to transfer said each pre-quantization access request to said time region quantizing means as said post-data-region-quantization access request when it is determined that said each pre-quantization access request does not need the data region quantization.

7. A data delivery server apparatus according to claim 5, wherein said time region quantizing means further includes receiving means for determining whether said each pre-quantization access request needs quantization of the data region, and for by-passing said data region quantizing means to transfer said each post-time-region-quantization access request to said reducing means as said post-quantization access request when it is determined that said each pre-quantization access request does not need the data region quantization.

8. A data delivery server apparatus according to claim 1, further comprising translating means for translating a logical address of said collective access request into a physical address of said data block corresponding to the logical address to supply the physical address to said access means.

9. A data delivery server apparatus according to claim 1, wherein said quantizing means further comprises monitor means for receiving said pre-quantization access requests and for monitoring the number of received pre-quantization access requests, and wherein said data delivery server apparatus further comprises means for adjusting at least one of a size of data region quantization unit and a size of time region quantization unit in accordance with the monitoring result of said monitor means.

10. A data delivery server apparatus according to claim 2, wherein a size of a data region quantization unit in said data region quantizing means is equal to that of data block in said storage means.

11. A data delivery server apparatus according to claim 2, wherein said pre-quantization access request has first and second parameters for designating said data, said pre-quantization access requests are grouped in accordance with the first parameters, and the second parameter designates a data position within said data corresponding to the group.

12. A data delivery server apparatus according to claim 2, wherein a size of a data region quantization unit in said data region quantizing means is different from that of data block in said storage means.

13. A data delivery server apparatus according to claim 3, wherein said time region quantizing means quantizes each request inputted thereto for every predetermined sampling time interval.

14. A data delivery server apparatus according to claim 3, wherein said time region quantizing means quantizes each request inputted thereto based on a time when the pre-quantization access is received.

15. A method of delivering a desired data in a server apparatus to which a plurality of terminal equipments are connected, comprising the steps of:

receiving an access request as pre-quantization access request from each of the plurality of terminal equipment, the pre-quantization access request requesting a data stored in a storage unit;

quantizing said pre-quantization access request in units of at least one of data region quantization units and time region quantization units to produce one or more post-quantization access requests associated with one or more data blocks of said data, wherein at least one of said data region quantization unit and said time region quantization unit is variable in size based on a number of said pre-quantization access requests; and reducing said post-quantization access request into a collective access request;

accessing said storage unit in accordance with each of said collective access requests to read out the corresponding data block from said storage unit; and delivering the data block to the plurality of terminal equipments which have issued said pre-quantization access requests corresponding to said each collective access request.

16. A method according to claim 15, wherein said quantizing step includes quantizing said pre-quantization access request in units of data region quantization units.

17. A method according to claim 15, wherein said quantizing step includes quantizing said pre-quantization access request in units of time region quantization units.

18. A method according to claim 15, wherein said quantizing step includes:

quantizing each of said pre-quantization access requests in units of data region quantization units to produce one or more post-data-region-quantization access requests; and quantizing each of said post-data-region-quantization access requests in units of time region quantization units to produce said one or more post-quantization access requests.

19. A method according to claim 15, wherein said quantizing step includes:

quantizing each of said pre-quantization access requests in units of time region quantization units to produce one or more post-time-region-quantization access requests; and quantizing each of said post-time-region-quantization access requests in units of data region quantization units to produce said one or more post-quantization access requests.

20. A method according to claim 18, wherein said receiving step further comprises the steps of:

determining whether said each pre-quantization access request needs quantization of the data region; and by-passing said data region quantization to execute the time region quantization to said each pre-quantization access request when it is determined that said each pre-quantization access request does not need the data region quantization.

21. A method according to claim 19, wherein said time region quantizing step further comprises the steps of:

determining whether said each pre-quantization access request needs quantization of the data region; and by-passing said data region quantization to execute said reducing step when it is determined that said each pre-quantization access request does not need the data region quantization.

22. A method according to claim 15, further comprising the step of translating a logical address of said collective access request into a physical address of said data block corresponding to the logical address.

23. A method according to claim 15, wherein said receiving step further comprises monitoring the number of received pre-quantization access requests, and wherein said method further comprises adjusting at least one of a size of data region quantization unit and a size of time region quantization unit in accordance with the monitoring result.

* * * * *